United States Patent
Matsuo et al.

(10) Patent No.: US 6,359,660 B1
(45) Date of Patent: Mar. 19, 2002

(54) SEMICONDUCTOR INTEGRATED CIRCUIT FOR CONVERTING MACRO-BLOCK DATA INTO RASTER DATA WHICH IS ADAPTABLE TO VARIOUS FORMATS

(75) Inventors: Natsuko Matsuo; Shiro Hosotani; Minobu Yazawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/914,192

(22) Filed: Aug. 19, 1997

(30) Foreign Application Priority Data

Mar. 19, 1997 (JP) .............................. 9-066360

(51) Int. Cl.[7] ........................... H04N 7/01; H04N 11/20
(52) U.S. Cl. ...................................... 348/716; 348/441
(58) Field of Search ................................. 348/441, 445, 348/458, 459, 554, 555, 556, 558, 716, 715; 345/516, 517, 521; H04N 7/01, 11/20, 3/27, 5/96, 9/64

(56) References Cited

U.S. PATENT DOCUMENTS

| | | | |
|---|---|---|---|
| 5,343,243 A | | 8/1994 | Maeda .......................... 348/222 |
| 5,500,577 A | | 3/1996 | Kim et al. .................... 315/364 |
| 5,623,311 A | * | 4/1997 | Phillips et al. ............... 348/715 |
| 5,912,676 A | * | 6/1999 | Malladi et al. ............. 345/516 |
| 5,973,707 A | * | 10/1999 | Mita .......................... 345/516 |
| 6,088,391 A | * | 7/2000 | Auld et al. .................. 348/716 |

FOREIGN PATENT DOCUMENTS

JP            8-171384              7/1996

* cited by examiner

Primary Examiner—Reinhard J. Eisenzopf
Assistant Examiner—Brian P. Yenke
(74) Attorney, Agent, or Firm—Burns, Doane, Swecker & Mathis, LLP

(57) ABSTRACT

A block to raster converting circuit which is adaptable to all formats with a single circuit is realized. Macro-block data is mapped into a frame memory (13) on the basis of a particular format whose data size (X) in the horizontal direction provides a max condition. When writing, for each macro-block row (MBRi), the address of the first data in the initial macro-block (IMBi) is specified, on the basis of which address the column and row addresses are regularly switched according to the data array in the macro-block (MB). When reading, for each macro-block row (MBRi), the address of the initial data is specified, on the basis of which address the row address is switched every time data in each horizontal line in the macro-block row (MBRi) has been read and every time data at a turn of the column address in the frame memory (13) has been read. The column address is sequentially switched.

12 Claims, 28 Drawing Sheets

X: THE NUMBER OF COLUMNS OF MACRO-BLOCKS
Y: THE NUMBER OF ROWS OF MACRO-BLOCKS
x: THE NUMBER OF COLUMNS OF DATA FORMING MACRO-BLOCK
y: THE NUMBER OF ROWS OF DATA FORMING MACRO-BLOCK clock

MBRSYNC

BLOCK DATA clock

RSYNC

HSYNC

Raster Data

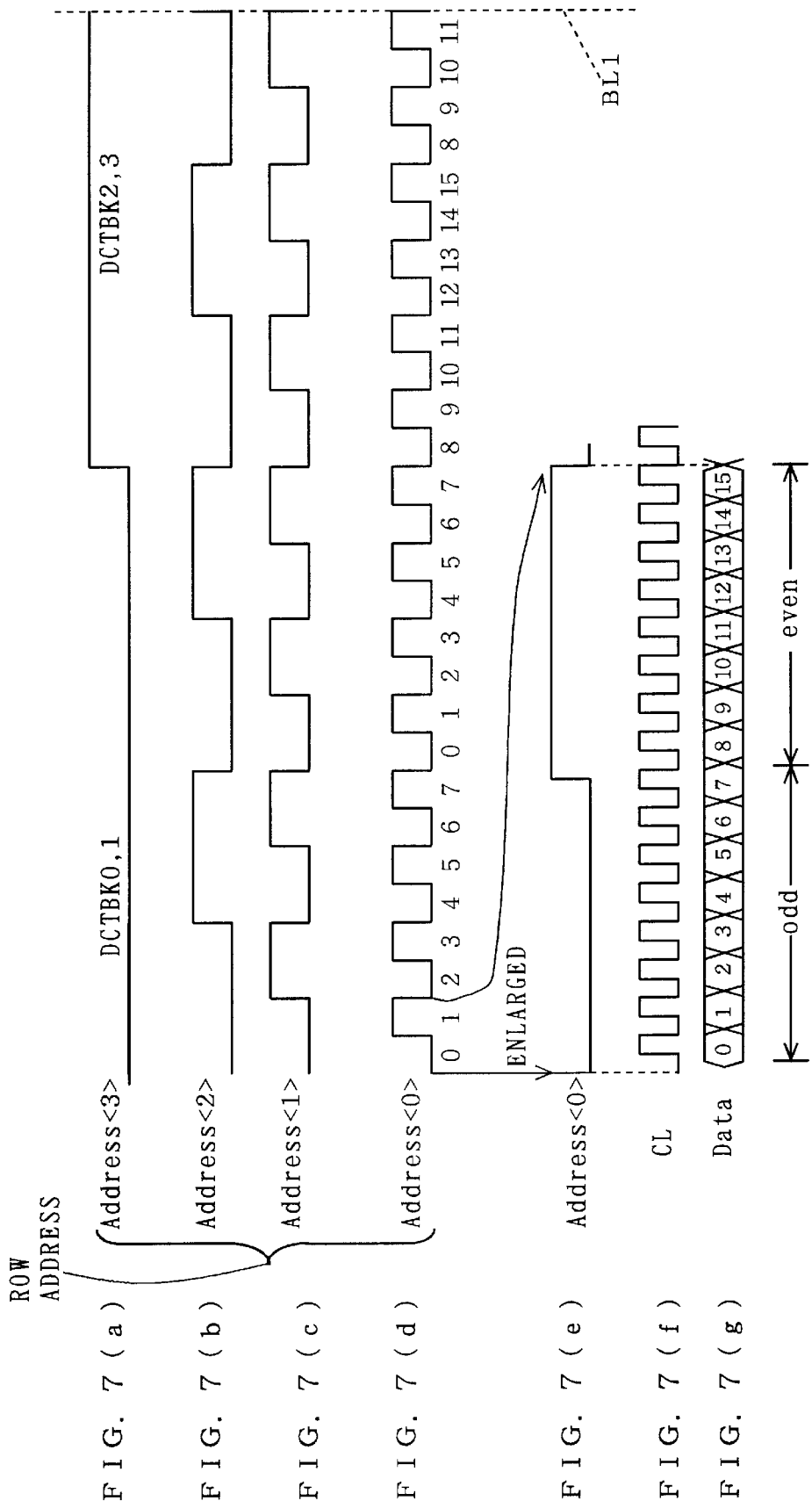

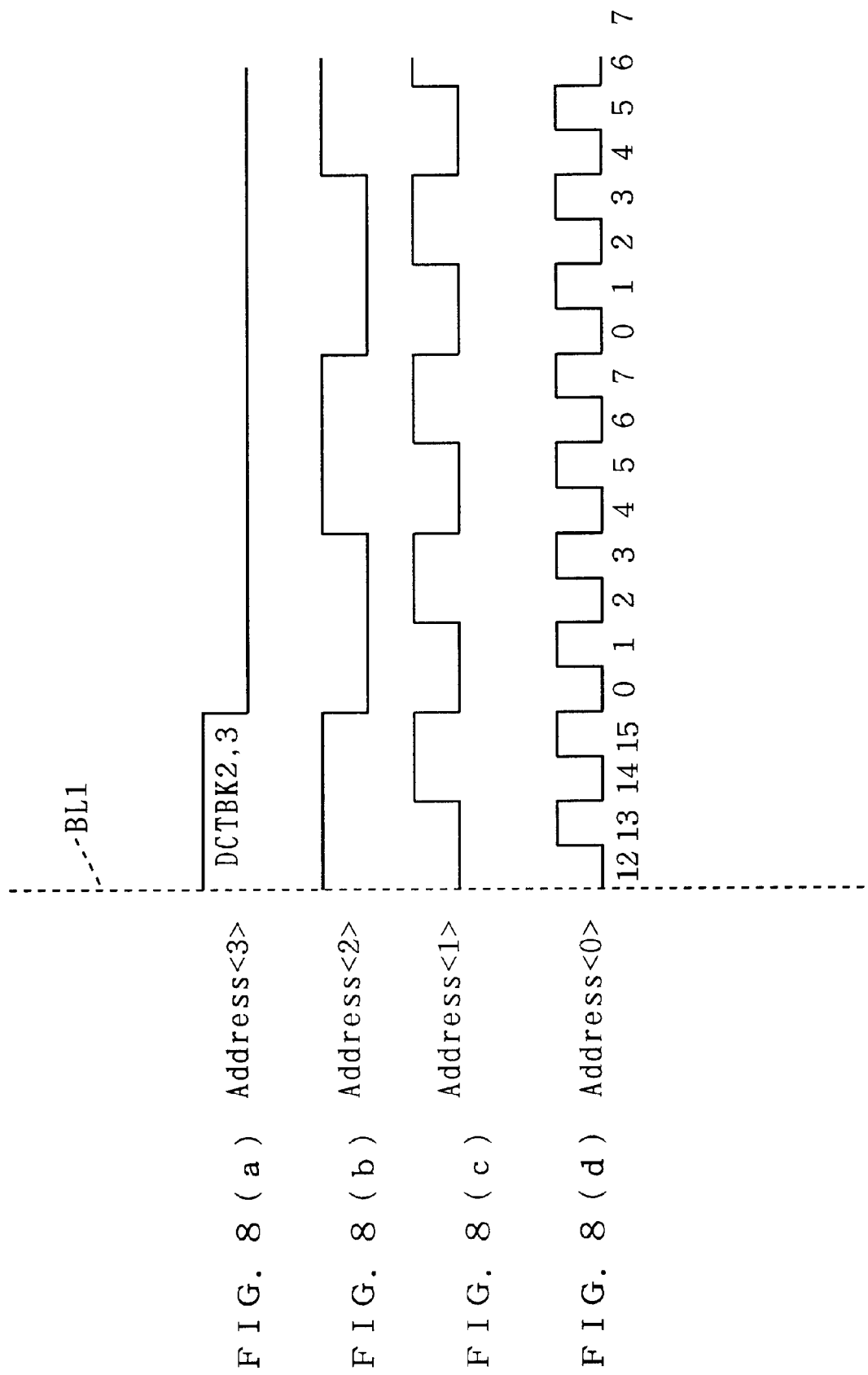

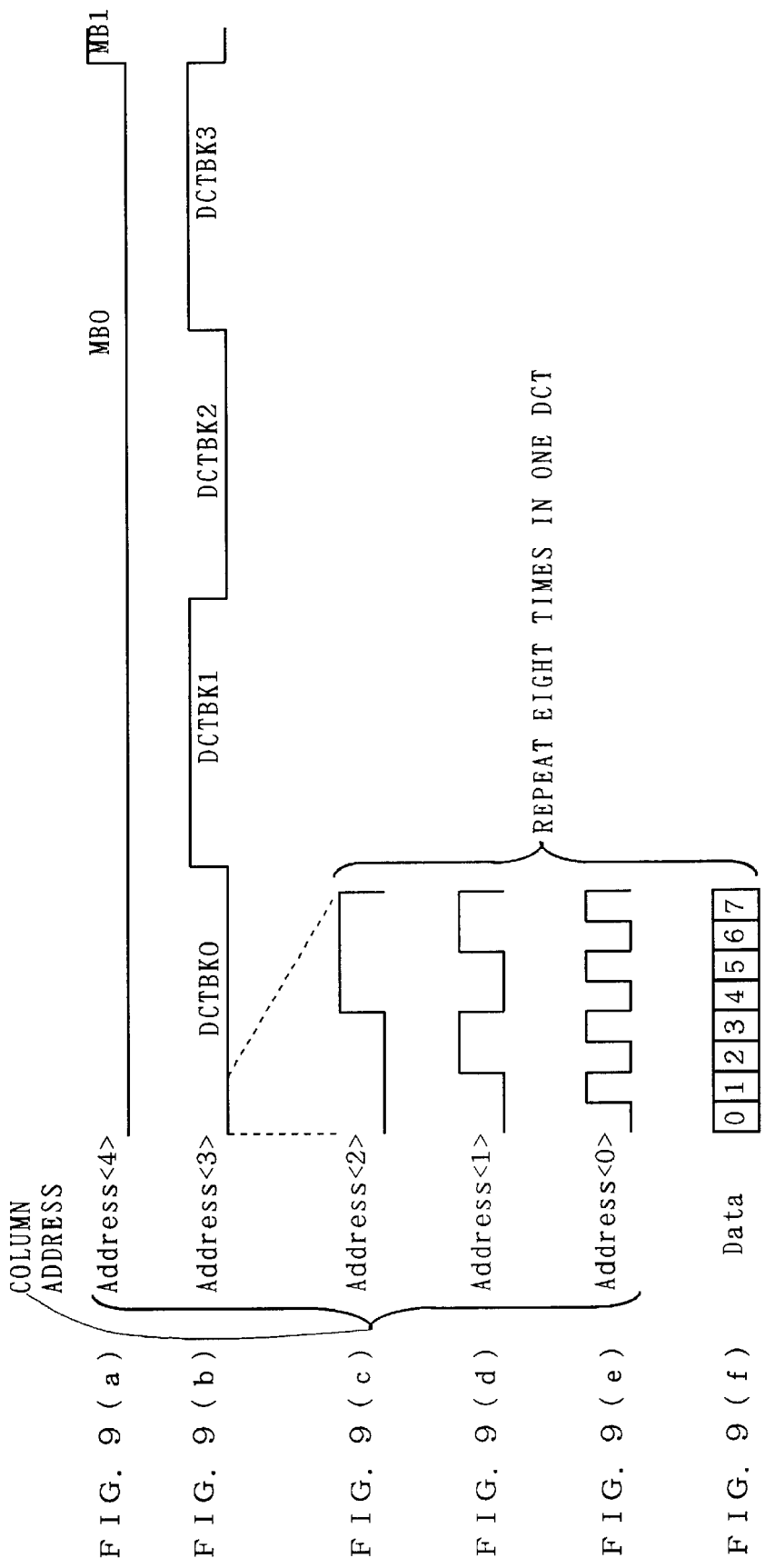

FIG. 13

OMB

| 0 | 1 | 2 | 3 | 4 | 5 | 6 | 7 | 64 | 65 | 66 | 67 | 68 | 69 | 70 | 71 |
|---|---|---|---|---|---|---|---|---|---|---|---|---|---|---|---|
| 16 | 17 | 18 | 19 | 20 | 21 | 22 | 23 | 80 | 81 | 82 | 83 | 84 | 85 | 86 | 87 |
| 32 | 33 | 34 | 35 | 36 | 37 | 38 | 39 | 96 | 97 | 98 | 99 | 100 | 101 | 102 | 103 |
| 48 | 49 | 50 | 51 | 52 | 53 | 54 | 55 | 112 | 113 | 114 | 115 | 116 | 117 | 118 | 119 |
| 128 | 129 | 130 | 131 | 132 | 133 | 134 | 135 | 192 | 193 | 194 | 195 | 196 | 197 | 198 | 199 |
| 144 | 145 | 146 | 147 | 148 | 149 | 150 | 151 | 208 | 209 | 210 | 211 | 212 | 213 | 214 | 215 |
| 160 | 161 | 162 | 163 | 164 | 165 | 166 | 167 | 224 | 225 | 226 | 227 | 228 | 229 | 230 | 231 |
| 176 | 177 | 178 | 179 | 180 | 181 | 182 | 183 | 240 | 241 | 242 | 243 | 244 | 245 | 246 | 247 |

FIG. 14

EMB

| 8 | 9 | 10 | 11 | 12 | 13 | 14 | 15 | 72 | 73 | 74 | 75 | 76 | 77 | 78 | 79 |
|---|---|---|---|---|---|---|---|---|---|---|---|---|---|---|---|
| 24 | 25 | 26 | 27 | 28 | 29 | 30 | 31 | 88 | 89 | 90 | 91 | 92 | 93 | 94 | 95 |
| 40 | 41 | 42 | 43 | 44 | 45 | 46 | 47 | 104 | 105 | 106 | 107 | 108 | 109 | 110 | 111 |
| 56 | 57 | 58 | 59 | 60 | 61 | 62 | 63 | 120 | 121 | 122 | 123 | 124 | 125 | 126 | 127 |
| 136 | 137 | 138 | 139 | 140 | 141 | 142 | 143 | 200 | 201 | 202 | 203 | 204 | 205 | 206 | 207 |
| 152 | 153 | 154 | 155 | 156 | 157 | 158 | 159 | 216 | 217 | 218 | 219 | 220 | 221 | 222 | 223 |
| 168 | 169 | 170 | 171 | 172 | 173 | 174 | 175 | 232 | 233 | 234 | 235 | 236 | 237 | 238 | 239 |
| 184 | 185 | 186 | 187 | 188 | 189 | 190 | 191 | 248 | 249 | 250 | 251 | 252 | 253 | 254 | 255 |

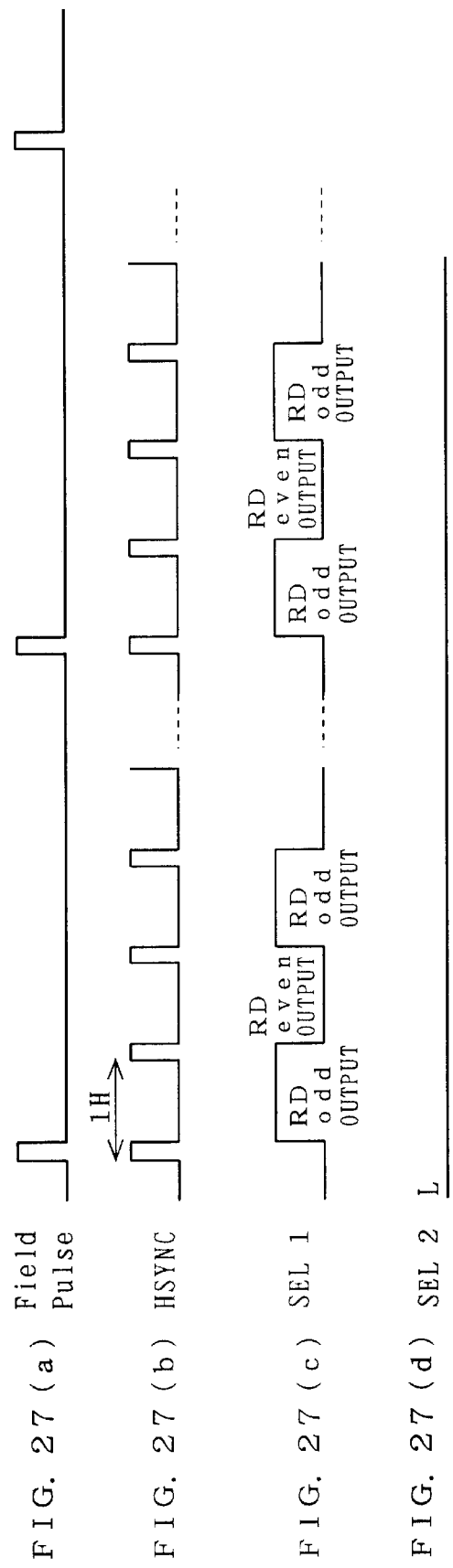

FIG. 28(a)
FP
FIG. 28(b)
SEL1  L 
FIG. 28(c)
SEL2 

FIG. 29(a) Field Pulse

FIG. 29(b) SEL 1    H    RDodd OUTPUT

FIG. 29(c) SEL 2    H    RDeven OUTPUT

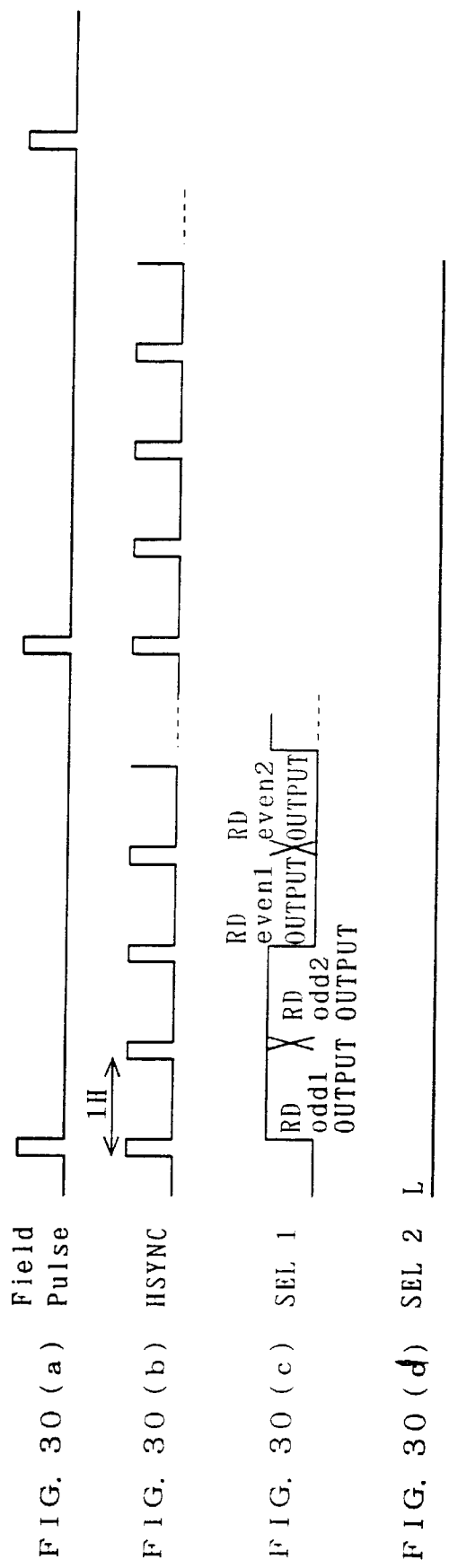

SEMICONDUCTOR INTEGRATED CIRCUIT FOR CONVERTING MACRO-BLOCK DATA INTO RASTER DATA WHICH IS ADAPTABLE TO VARIOUS FORMATS

BACKGROUND OF THE INVENTION

1. Field of the Invention

The present invention relates to semiconductor integrated circuits for converting data constituted in block units (hereinafter referred to as block data) into raster data. Particularly, the present invention relates to a technique suitable for the so-called next-generation digital television in multimedia. The present invention is, of course, also applicable to fields other than the next-generation digital television.

2. Description of the Background Art

The techniques for realizing the block-raster conversion/inverse conversion with a small-scale circuit include that disclosed in Japanese Patent Laying-Open No. 8-171384, for example. In this technique, with an address provided to a block buffer, reading operation is made in the first half and data is written into the free area caused by the reading. This reduces the number of the block buffers from two to one and also enables simply structured calculation of the access addresses.

However, the conventional block/raster converting technique is adaptable only to one particular video format. For example, the above-mentioned conventional converting technique (Japanese Patent Laying-Open No. 8-171384) is adaptable only to NTSC standard for television broadcasting, whose objects are size reduction of a block/raster converting circuit and size reduction of the memory capacity with a particular format.

However, the next-generation digital television (advanced TV) which performs a part of the recent improvements in multimedia technique requires a circuit which converts MPEG2 standard block data into raster data. Furthermore, since it handles video sources of various formats (or the number of macro-blocks), it is necessary to develop a converting circuit which is adaptable to all of the formats. The conventional technique can not deal with such new technical problems.

SUMMARY OF THE INVENTION

According to a first aspect of the present invention, a semiconductor integrated circuit for converting macro-block data into raster data comprises: a memory; and memory control means for controlling mapping of the macro-block data of an arbitrary format among a plurality of formats into the memory on the basis of mapping in the case of a particular format having a maximum data size in a horizontal direction among the plurality of formats.

Preferably, according to a second aspect, in the semiconductor integrated circuit of the first aspect, the memory comprises a memory region including maximum macro-block row regions into each of which the macro-block data included in each of a plurality of maximum macro-block rows can be mapped, the plurality of maximum macro-block rows each having a region determined on the basis of the data size of the particular format in the horizontal direction and in a vertical direction, and the memory control means comprises mapping control means for mapping the macro-block data of the arbitrary format, for each macro-block row whose region is determined on the basis of the data size of the arbitrary format, into one of the maximum macro-block row regions corresponding to that macro block row, according to a data array of a plurality of macro-blocks belonging to that macro-block row.

Preferably, according to a third aspect, in the semiconductor integrated circuit of the second aspect, the mapping control means comprises address generating means for, for each macro-block row of the arbitrary format, specifying an address of the macro-block data at the head of an initial macro-block belonging to that macro-block row as initial data in corresponding one of the maximum macro-block row regions, on the basis of which address the address generating means generating addresses of the macro-block data belonging to that macro-block row in accordance with the data array and outputting the obtained address signal to the memory.

Preferably, according to a fourth aspect, in the semiconductor integrated circuit of the third aspect, the memory control means further comprises data read control means for, for each macro-block row of the arbitrary format, specifying a row address and a column address of the address of the initial macro-block data belonging to that macro-block row, switching the column address on the basis of the address of the initial macro-block data, and switching the row address when the macro-block data belonging to a line in the horizontal direction belonging to that macro-block row has been all read and when the macro-block data written in an address at a turn of each of the maximum macro-block row regions has been read, thereby reading data from the memory region.

Preferably, according to a fifth aspect, in the semiconductor integrated circuit of the fourth aspect, the memory region comprises first and second memory regions, and the address generating means comprises (a) means for mapping the macro-block data belonging to odd lines in the horizontal direction in the macro-block into the first memory region, and (b) means for mapping the macro-block data belonging to even lines in the horizontal direction in the macro-block into the second memory region.

Preferably, according to a sixth aspect, in the semiconductor integrated circuit of the fourth aspect, the memory comprises, as the memory region, first and second memory regions separated into two in its bit direction, and the address generating means comprises pre-processing means for pre-processing the sequentially inputted macro-block data into bus data having odd line data formed of the macro-block data belonging to odd lines in the horizontal direction in the macro-block and even line data formed of the macro-block data belonging to even lines in the horizontal direction each corresponding to the line next to each of the odd lines in the horizontal direction, and means for mapping the odd line data and the even line data into the first and second memory regions, respectively.

Preferably, according to a seventh aspect, in the semiconductor integrated circuit of the sixth aspect, the data read control means comprises means for simultaneously reading the odd line data and the even line data corresponding thereto as the bus data, wherein the semiconductor integrated circuit further comprises post-processing means for applying certain post-processing to the read bus data to output the raster data having a certain output format.

Preferably, according to an eighth aspect, the semiconductor integrated circuit of the fourth aspect further comprises precharge means for regularly precharging the memory region in accordance with a format having a minimum timing for switching the row address when reading the macro-block data.

Preferably, according to a ninth aspect, in the semiconductor integrated circuit of the second aspect, the mapping control means comprises address generating means for, for each macro-block row of the arbitrary format, specifying an address of the macro-block data at the end belonging to that macro-block row as final data in corresponding one of the maximum macro-block row regions, and determining an address of the macro-block data at the head of an initial macro-block belonging to that macro-block row on the basis of a difference between the data size of the particular format in the horizontal direction and the data size of the arbitrary format in the horizontal direction, thereby generating an address signal for the macro-block data belonging to that macro-block row and outputting the address signal to the memory.

Preferably, according to a tenth aspect, in the semiconductor integrated circuit of the ninth aspect, the memory control means further comprises data read control means for, for each macro-block row of the arbitrary format, specifying a row address and a column address of the address of the initial macro-block data belonging to that macro-block row, sequentially switching the column address on the basis of the address of the initial macro-block data, and switching the row address when the macro-block data belonging to a line in the horizontal direction belonging to that macro-block row has been all read and when the macro-block data written in an address at a turn of each of the maximum macro-block row regions has been read, thereby reading data from the memory region.

Preferably, according to an eleventh aspect, in the semiconductor integrated circuit of the tenth aspect, the memory region comprises first and second memory regions, and the address generating means comprises (a) means for mapping the macro-block data belonging to odd lines in the horizontal direction in the macro-block into the first memory region, and (b) means for mapping the macro-block data belonging to even lines in the horizontal direction in the macro-block into the second memory region.

Preferably, according to a twelfth aspect, in the semiconductor integrated circuit of the tenth aspect, the memory comprises, as the memory region, first and second memory regions separated into two in its bit direction, and the address generating means comprises pre-processing means for pre-processing the sequentially inputted macro-block data into bus data having odd line data formed of the macro-block data belonging to odd lines in the horizontal direction in the macro-block and even line data formed of the macro-block data belonging to even lines in the horizontal direction each corresponding to the line next to each of the odd lines in the horizontal direction, and means for mapping the odd line data and the even line data into the first and second memory regions, respectively.

Preferably, according to a thirteenth aspect, in the semiconductor integrated circuit of the twelfth aspect, the data read control means comprises means for simultaneously reading the odd line data and the even line data corresponding thereto as the bus data, wherein the semiconductor integrated circuit further comprises post-processing means for applying certain post-processing to the read bus data to output the raster data having a certain output format.

Preferably, according to a fourteenth aspect, the semiconductor integrated circuit of the tenth aspect further comprises precharge means for regularly precharging the memory region in accordance with a format having a minimum timing for switching the row address when reading the macro-block data.

According to a fourteenth aspect, a semiconductor integrated circuit comprises: a macro-block data signal input line for inputting macro-block data; and a memory connected to the macro-block data signal input line, and into which the macro-block data of an arbitrary format among a plurality of formats is mapped on the basis of mapping in the case of a particular format having a maximum data size in its horizontal direction among the plurality of formats.

According to a sixteenth aspect, a semiconductor integrated circuit comprises: a clock signal input line for inputting a clock and a macro-block data signal input line for inputting a plurality of macro-block data related to a certain format among a plurality of formats for each macro-block on the basis of the clock; a memory control signal input line for inputting a memory control signal for controlling timing of writing and reading data; an address generating circuit connected to the clock signal input line and the memory control signal input line, for generating addresses for mapping the macro-block data related to the certain format on the basis of mapping of the plurality of macro-block data related to a particular format having a maximum data size in its horizontal direction among the plurality of formats in accordance with the clock and the memory control signal; and a memory connected to the macro-block data signal input line, the clock signal input line, the memory control signal input line and an output line of the address generating circuit, and into which the plurality of macro-block data are written on the basis of the memory control signal and the addresses.

According to the first to third, ninth, and fifteenth and sixteenth aspects, mapping can be done with the same circuit even with different formats, which enables mapping as preparations for block-to-raster conversion with the same circuit.

Particularly, according to the ninth aspect, it is possible to realize area reduction of the circuit.

According to the fourth and tenth aspects, since raster data can always be read irrespective of the format, it is easy to apply block-to-raster conversion to each of various formats.

According to the fifth and eleventh aspects, all macro-block data to be converted can be mapped separately as odd line data and even line data. Accordingly, (1) the odd line data and the even line data can be independently outputted, or (2) one of the odd line data and the even line data can be repeatedly outputted, providing various and easy-to-change output formats of raster data.

According to the sixth and twelfth, and seventh and thirteenth aspects, (1) the odd line data and the even line data can be independently outputted, (2) the odd line data and the even line data can be simultaneously outputted, or (3) one of the odd line data and the even line data can be repeatedly outputted, easily enabling a more variety of output formats.

According to the eighth and fourteenth aspects, precharge can be done with a common circuit which is independent of the format.

The present invention has been made to solve the above-described problem. Its first object is to realize block data/raster data conversion adaptable to a plurality of formats with the same device. The present invention provides various novel mapping techniques for this purpose.

A second object of the present invention is to enable a single circuit to easily output raster data of different output formats.

Furthermore, a third object of the present invention is to enable precharging of a memory which is independent of input/output formats.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7(a)–(g) provide timing charts showing the row address in writing.

FIGS. 8(a)–(d) provide timing charts showing the row address in writing.

FIGS. 9(a)–(f) provide timing charts showing the column address in writing.

FIG. 13 is a diagram showing a data array in an odd line macro-block.

FIG. 14 is a diagram showing a data array in an even line macro-block.

FIGS. 27(a)–(d) provide diagrams showing the timing of first and second select signals for alternately outputting odd line data and even line data.

FIGS. 28(a)–(c) provide diagrams showing the timing of the first and second select signals for alternately outputting the odd line data and the even line data.

FIGS. 29(a)–(c) provide timing charts of the first and second select signals for simultaneously outputting the odd line data and the even line data.

FIGS. 30(a)–(d) provide timing charts of the first and second select signals for line repeating output.

Figure 1:
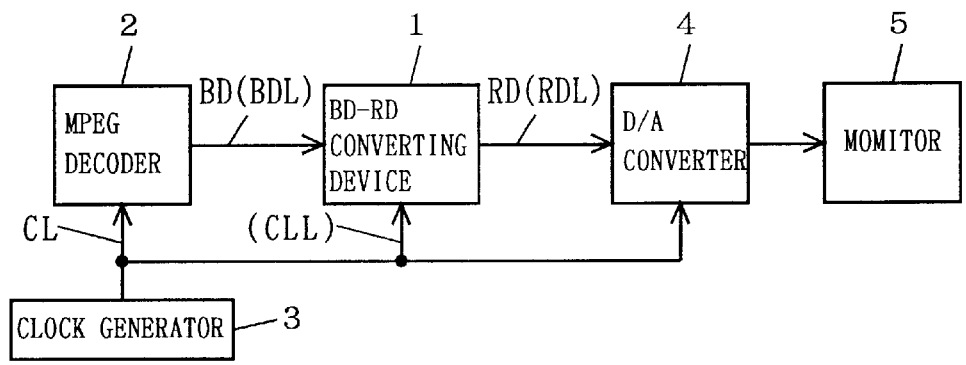
FIG. 1 is a block diagram showing the entire configuration of the system.

DESCRIPTION OF THE PREFERRED EMBODIMENTS (First Preferred Embodiment)

A semiconductor integrated circuit according to a first preferred embodiment is related to a circuit for converting an array of two-dimensional (X×Y) data formed of two-dimensional (x×y) macro-block data from a block data format into a raster data format. This conversion is hereinafter referred to as block to raster conversion (or block/raster conversion).

This technique pays attention to the following points. That is, although video sources having various formats are handed, the maximum value of the format is determined by the specification of the chip. Hence, according to this converting circuit, with macro-block data of an arbitrary format, (1) the data is mapped ("mapping" means to write corresponding macro-block data into addresses or cells in a memory specified by address signals) into a memory in macro-block row units on the basis of a particular format having the maximum video format size in the horizontal direction, (2) whereby the address of the initial data of the macro-block row is unchanged irrespective of the format, and (3) the macro-block data is sequentially mapped on the basis of that address. (4) Each line data in each macro-block row in the memory is then sequentially read to obtain a data array of raster data.

Now, the configuration of this circuit will be fully described referring to the drawings.

FIG. 1 is a block diagram showing the entire configuration of a system applicable to the next-generation television. In this figure, the block/raster converting device (hereinafter referred to as a BD-RD converting device) 1 plays a major role in the first preferred embodiment, and other components are peripheral external circuits. The MPEG decoder 2 decodes coded (compressed) data adjusted to MPEG2 standard which has been obtained by applying DCT (Discrete Cosine Transform) operation to each macro-block (MB) with 16×16 picture elements, which outputs 8-bit decoded image data, as the macro-block data BD, to the BD-RD converting device 1 in the order of the block data array. The signal line for inputting the macro-block data BD into the BD-RD converting device 1 is defined as "a macro-block data signal input line BDL."

The clock generator 3 generates a basic clock of this system, or a system clock (referred to merely as a clock) CL and outputs the clock CL to the components 2, 1, and 4. The signal line for inputting the clock CL into the BD-RD converting device 1 is referred to as "a clock signal input line CLL."

The D/A converter 4 digital-to-analog converts the raster data RD outputted from the BD-RD converting device 1 according to the order of the data array of the rater data format, and the monitor 5, e.g., a CRT display, monitors the D/A converted video data. The signal line for inputting the raster data RD into the D/A converter 4 is defined as "a raster data output signal line RDL."

The BD-RD converting device 1 mainly includes (1) a circuit for internally generating a macro-block row signal and (2) an address generating circuit for generating address signals for sequentially mapping the macro-block data BD into a memory. Even when handling data of a plurality of formats with different macro-block data sizes (X×Y), it enables BD-RD converting processing independent of the format. The configuration of the BD-RD converting device 1 will be described in detail.

Figure 2:
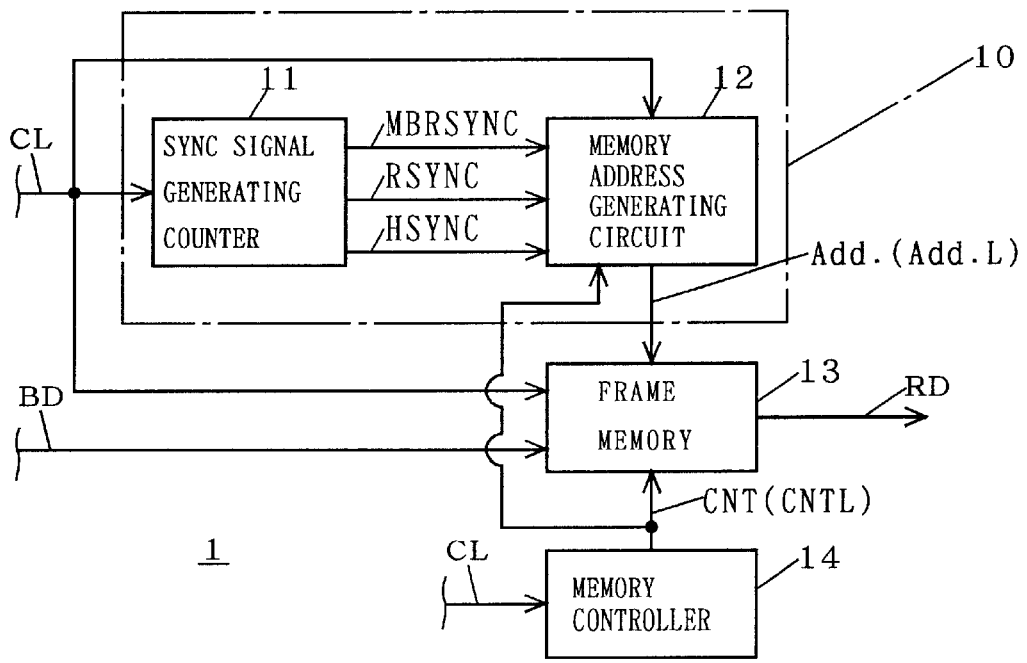
FIG. 2 is a block diagram showing a configuration of a BD-RD converting device according to a first preferred embodiment.

FIG. 2 is a block diagram showing a configuration of the BD-RD converting device 1. The converting device 1 can be roughly divided into an address generating portion 10 playing a main role, a frame memory (or a memory) 13, and a memory controller 14. The address generating portion 10 has a counter function, which includes a synchronizing signal generating counter 11 and a memory address generating circuit (formed of a counter) 12. This circuit 12 generates an address signal (simply referred to as an address) Add. formed of a column address and a row address, based on which the frame memory 13 maps the coming macro-block data BD. The output line for the address Add. is defined as an address signal input (or output) line Add.L.

The memory controller 14 generates a control signal CNT for controlling write of the macro-block data BD into the frame memory 13 and read of data from the frame memory 13 on the basis of the clock CL, and outputs the signal CNT to the frame memory 13 and the memory address generating circuit 12. The output line for the control signal CNT is defined as "a memory control signal input (or output) line." The control signal CNT generically indicates a read/write instruction signal, a write enable signal (WE), a column address strobe signal (CAS), a row address strobe signal (RAS), a frame signal, etc.

A signal MBRSYNC is a synchronizing signal for the macro-block row, which is a control signal required in write operation into the frame memory 13.

Figure 3:
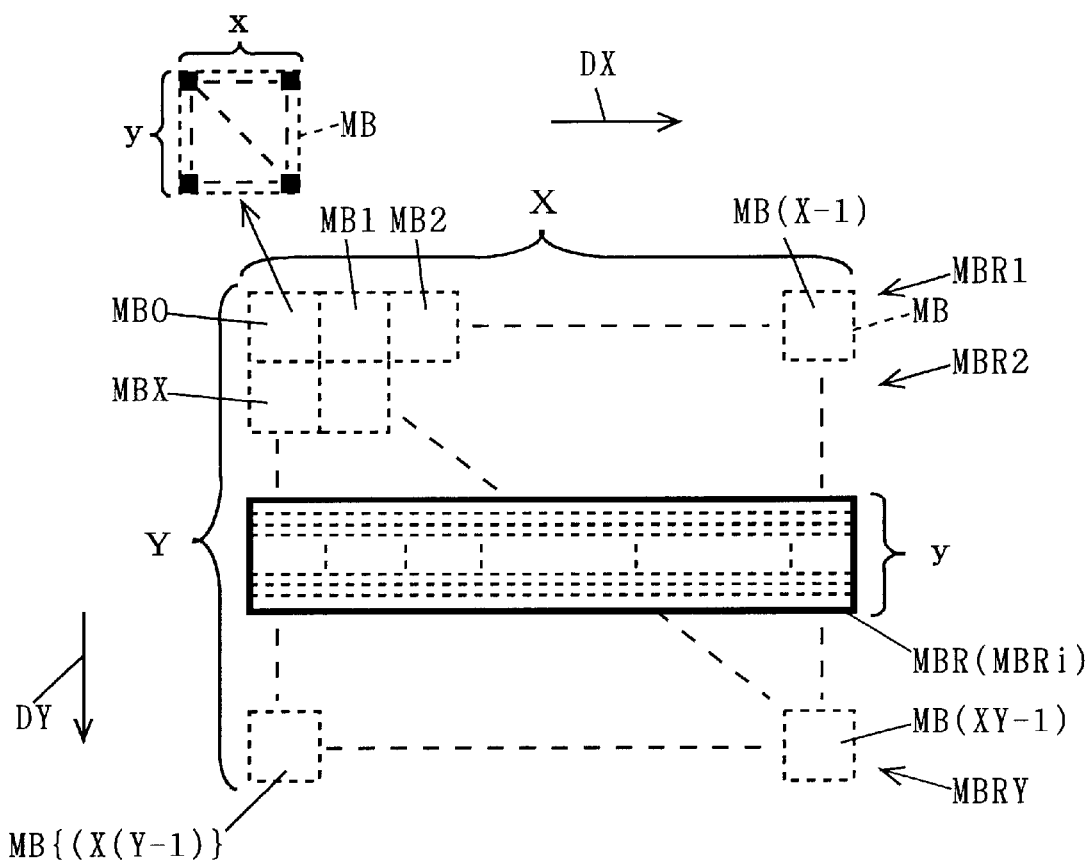
FIG. 3 is a diagram showing a format formed of (X×Y) macro-blocks.

The "macro-block row" means an area including all macro-blocks arranged in the same row (horizontal direction) in (X×Y)-sized macro-blocks. In the example of the (X×Y) macro-blocks MB shown in FIG. 3, it corresponds to the part surrounded by the thick line expressed by the character MBR or MBRi in FIG. 3. In FIG. 3, the character DX indicates the horizontal direction and the character DY indicates the vertical direction.

A signal HSYNC in FIG. 2 is a synchronizing signal for lines of the raster data RD. That is to say, in the example of FIG. 3, since one macro-block MB includes (x×y) pieces of data (or picture elements), the macro-block row MBR includes y scanning lines. One pulse of the synchronizing signal HSYNC is provided at the beginning or at the end of each scanning line. A signal RSYNC in FIG. 2 is a signal synchronized with a period corresponding to several lines of periods of the synchronizing signal HSYNC. These synchronizing signals HSYNC and RSYNC are used as control signals in operation of reading the raster data RD from the frame memory 13.

The macro-block data BD is mapped into the frame memory 13 on the basis of a format whose size (X×Y) forms the max condition among handled formats. This point characterizes this preferred embodiment. Accordingly, this is described in an specific example to facilitate the understanding.

For example, in television video, the format of a progressive source has a data size of 1280 picture elements (horizontal direction (X))×720 picture elements (vertical direction (Y)), and the format of an interlacing source has a data size of 1920 picture elements (X)×1088 picture elements (Y), which forms the max condition.

Figure 4:
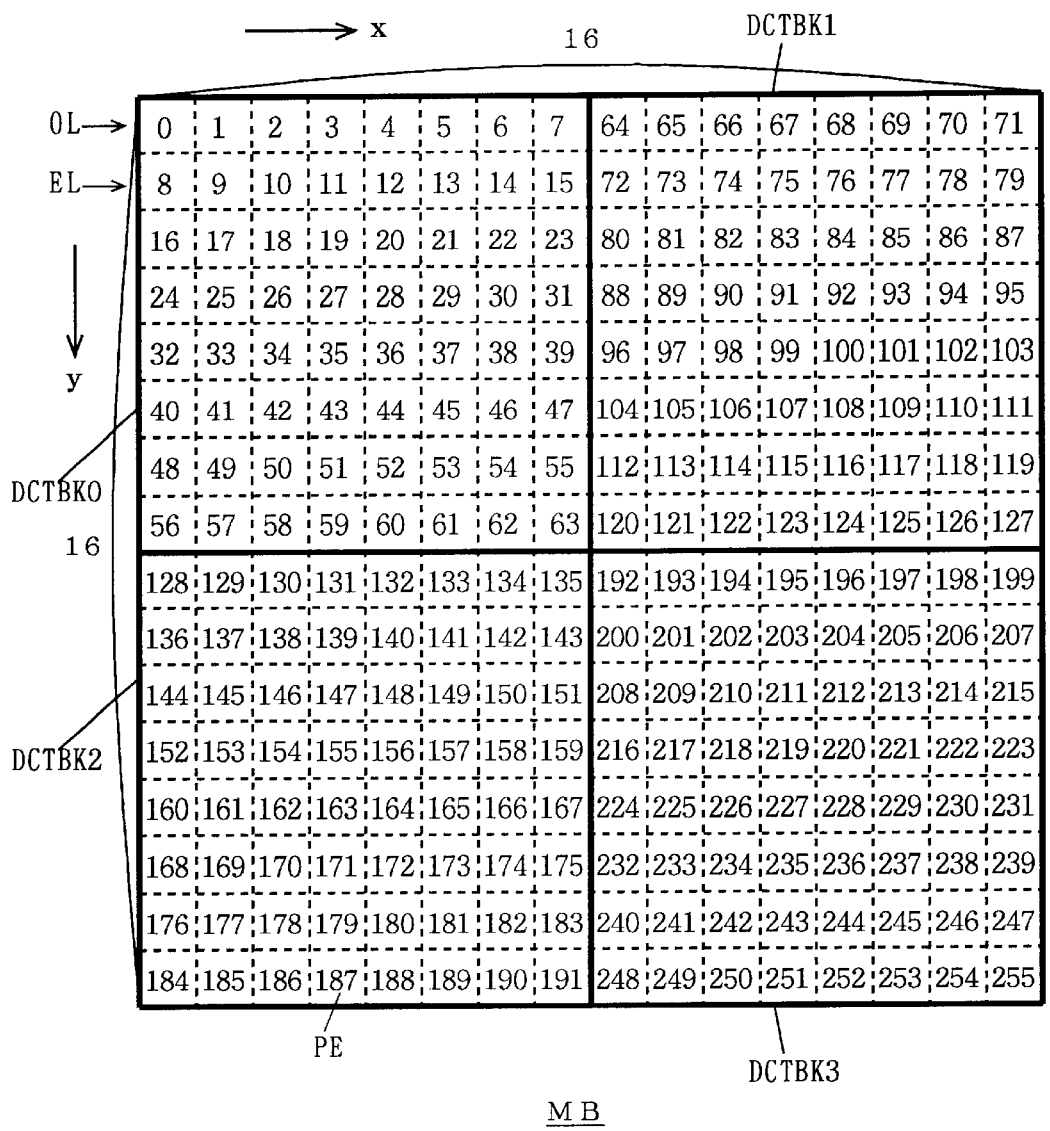
FIG. 4 is a diagram showing an array of the macro-block data in one macro-block.

Accordingly, the latter format is adopted as the basis of the mapping. In this case, the data size (X×Y) of the format can be expressed as follows in terms of the number of macro-blocks MB formed of 16 picture elements (x)×16 picture elements (y). That is to say, (x×y)=(16×16), (X×Y)= (120×68), where one macro-block row MBR (FIG. 3) includes 16 scanning lines. FIG. 4 shows the format of an arbitrary macro-block MB in this case.

As shown in FIG. 4, the macro-block MB includes four DCT blocks DCTBK0-DCTBK3 each including 8 picture elements×8 picture elements. The numbers attached to the picture elements PE in FIG. 4 show the order (array) of the macro-block data BD inputted or transferred to the frame memory 13 of FIG. 2, wherein each picture element PE is 8-bit data. The y direction in FIG. 4 corresponds to the word line direction in the frame memory 13.

Figure 5:
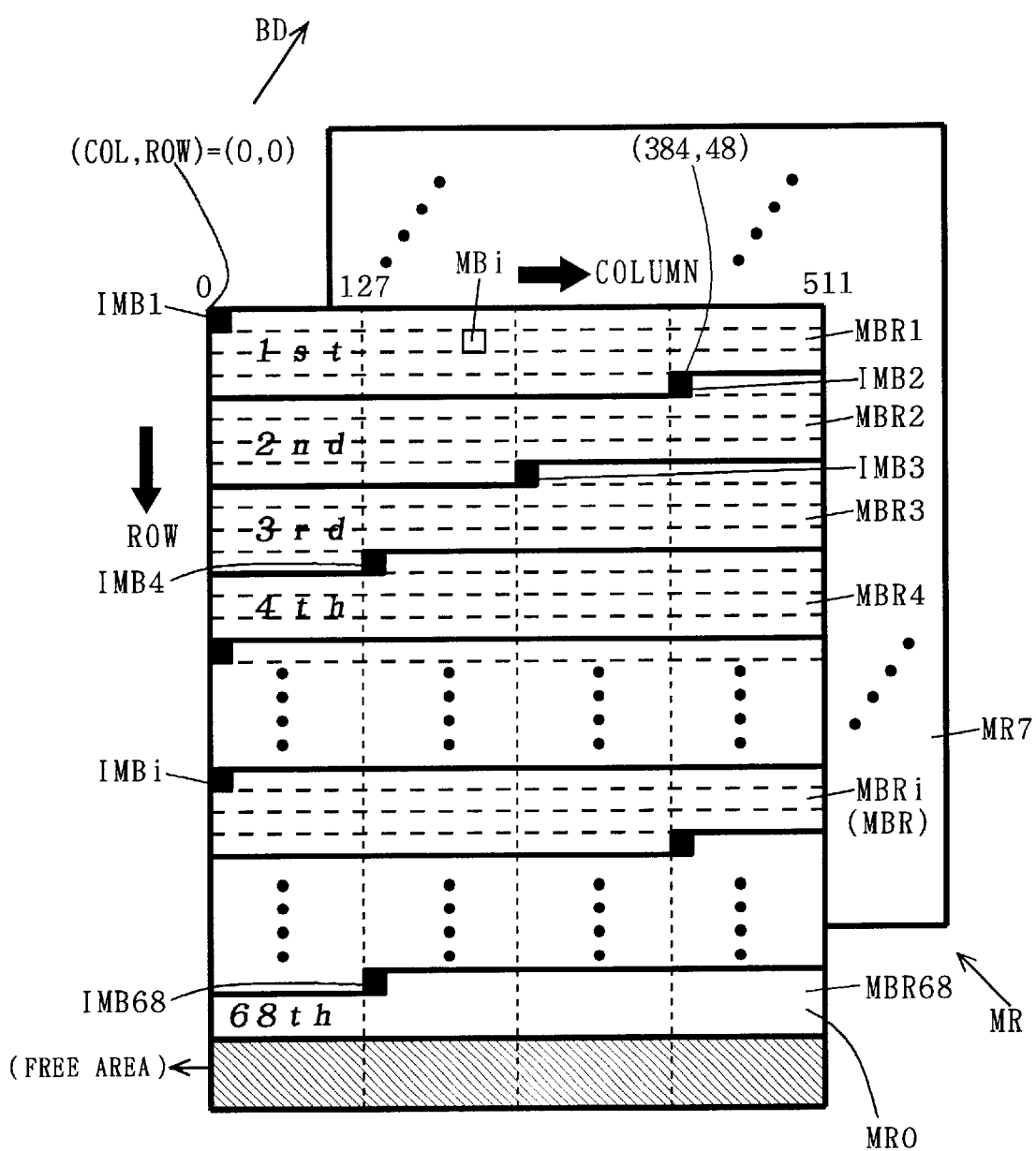
FIG. 5 is a diagram showing a mapping method in the first preferred embodiment.

FIG. 5 shows a method of mapping the macro-block data BD when the frame memory 13 has a column size of 512. As one picture element is 8-bit data, the memory region MR has eight regions MR0–MR7 in the bit direction BD. Each macro-block row MBR in FIG. 5 is a region into which all macro-block data in macro-blocks of the particular format having the data size X of 120 (maximum) in the horizontal direction can be written, which is referred to as "a maximum macro-block row" herein. Each black square in FIG. 5 indicates a macro-block MB in the head position of each macro-block row MBR. The first, second, third, ith, . . . , 68th macro-block rows MBR are respectively indicated as MBR1, MBR2, MBR3, . . . , MBRi, . . . , MBR68, where the macro-block IMB at the head (referred to as an initial macro-block) of the ith ($1 \leq i \leq 68$) macro-block row MBRi is generalized as IMBi.

Figure 6A:
FIGS. 6A(a)–(c), 6B(a)–(d) provide timing charts in reading and writing.
Figure 6A:
Figure 6A:
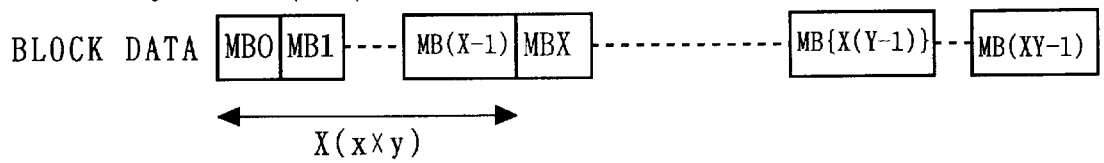
Figure 6B:
Figure 6B:
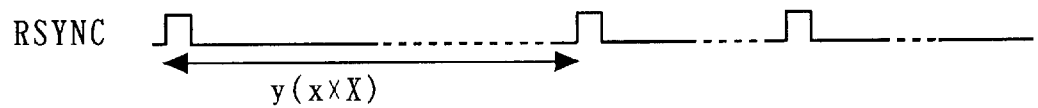
Figure 6B:
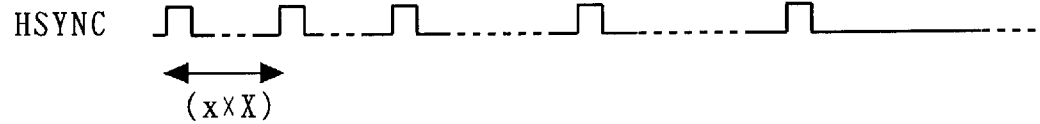
Figure 6B:
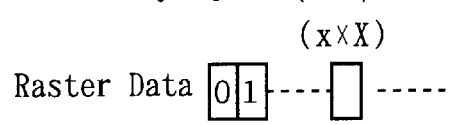

FIGS. 6A and B shows a timing chart of the sync signals in the case of converting data formed of (X×Y) macro-blocks MB shown in FIG. 3. FIGS. 6A($a$)–($c$) shows a timing chart in write operation and FIGS. 6B($a$)–($d$) shows that in read operation. FIGS. 6A($a$)–($c$) and 6B($a$)–($d$) do not show the timing of the control signal CNT in FIG. 2. The BD-RD converting device 1 (FIG. 2) operates as follows.

(A) In write operation, at each rising timing of the pulse of the sync signal MBRSYNC, the memory address generating circuit 12 of FIG. 2 specifies the address of the first data of each initial macro-block IMBi (in the first macro-block row MBR1 in FIG. 5, for example, it corresponds to the data "0" at (column, row)=(0, 0) in the initial macro-block IMB1 shown as a black square), on the basis of which address the circuit 12 regularly switches the column address and the row address for the following macro-block data "1," "2," . . . , "255" according to the array of the macro-block data (refer to FIG. 4) in that macro-block IMBi.

FIGS. 7($a$) to ($g$), FIGS. 8($a$) to ($d$), FIGS. 9 ($a$) to ($f$) show the address Add. (FIG. 2) for mapping one macro-block MBi (FIG. 5). FIGS. 7($a$)–($g$) and FIGS. 8($a$)–($d$) show the row address timing and FIGS. 9($a$)–($f$) shows the column address timing. In FIGS. 7($a$)($g$) and FIGS. 8($a$)–($d$), the characters "DCTBK0, 1" each show the periods for addressing data in each DCT block DCTBK0, DCTBK1 shown in FIG. 4. The same applies to the characters "DCTBK2, 3." The characters Address <0>-Address <3> in FIGS. 7($a$)–($g$), FIGS. 8($a$)–($d$) show row addresses for mapping a certain macro-block row MBRi (FIG. 5).

(B) In read operation, in order to provide a raster data array, it is necessary to read each data in the horizontal line direction DX shown in FIG. 3. Hence, as shown in FIG. 6, the circuit 12 in FIG. 2 specifies the address of the initial data in each macro-block row MBRi (in the first macro-block MBR1 shown in FIG. 3, FIG. 5, it corresponds to the data "0" in the macro-block row MB0, for example) at each rising timing of the pulse of the synch signal (a first read control signal) RSYNC, and on the basis of which address it switches the row address at each rising timing of the sync signal (a second read control signal) HSYNC providing a beginning of one line and at each turn of the column address of the frame memory 13 (in the example of FIG. 5, the 512th column address) (or when the 512th picture element is outputted). In the same row address, the memory address generating circuit 12 sequentially switches the column address to sequentially read the data in the same row. The raster data RD (FIG. 2) is thus outputted.

These operations (A) and (B) achieve the BD/RD conversion (X, Y).

With a format (an arbitrary format) of a data size (X, Y) satisfying the relation (X×Y)<(120×68), the circuit 12 of FIG. 2 specifies the address Add. of that format of the first data in the initial macro-block IMBi (FIG. 5) at each rising timing of the sync signal MBRSYNC, as in the case of the format forming the max condition (X×Y)=(120×68), and outputs it to the frame memory 13. In the memory region as a maximum macro-block row, a free area occurs in each macro-block row MBRi, since the X size of that format is short of 120, but it causes no problem.

Thus, the address of the first data in an initial macro-block IMBi is fixed in each macro-block row MBRi determined on the basis of the max condition of a particular format having the maximum size in the horizontal direction. Then, even with different formats, block to raster conversion can be made with an arbitrary format by using a common circuit which is independent of the format size (X×Y).

(Second Preferred Embodiment)

This preferred embodiment is an example of an application of the first preferred embodiment, which is equivalent to the first preferred embodiment in that the macro-block data are mapped on the basis of the max condition in the horizontal direction of a format having the maximum data size (X×Y), but the address of the first data in each initial macro-block is specified in each macro-block row in a different manner. That is to say, the address is specified for each format on the basis of a difference between the X size of the particular format having the max condition and the X size of a format to be handled so that the address of the last data in the final macro-block in the macro-block row is always fixed independently of the format.

Figure 10:
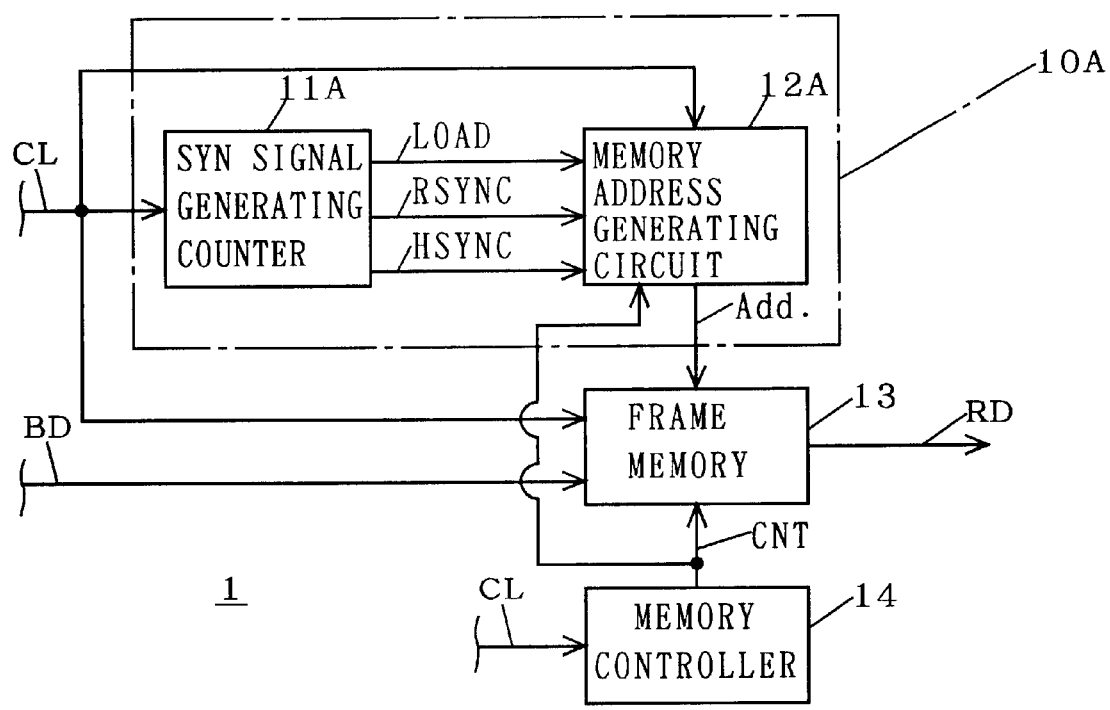
FIG. 10 is a block diagram showing a configuration of a BD-RD converting device according to a second preferred embodiment.

FIG. 10 is a block diagram of a BD-RD converting device 1 in the second preferred embodiment and the entire configuration of the system is the same as that shown in FIG. 1. A sync signal generating circuit 11A of this device 1 outputs a load signal LOAD which provides a difference value given by {(the X size of the particular format having the max condition)−(the X size of an object format)}. The sync signals RSYNC, HSYNC in read are the same as those in the first preferred embodiment. For example, when the particular format providing the max condition is that of an interlacing source (X=120) and the object format is that of a progressive source (X=80), the difference value is 40.

Figure 11:
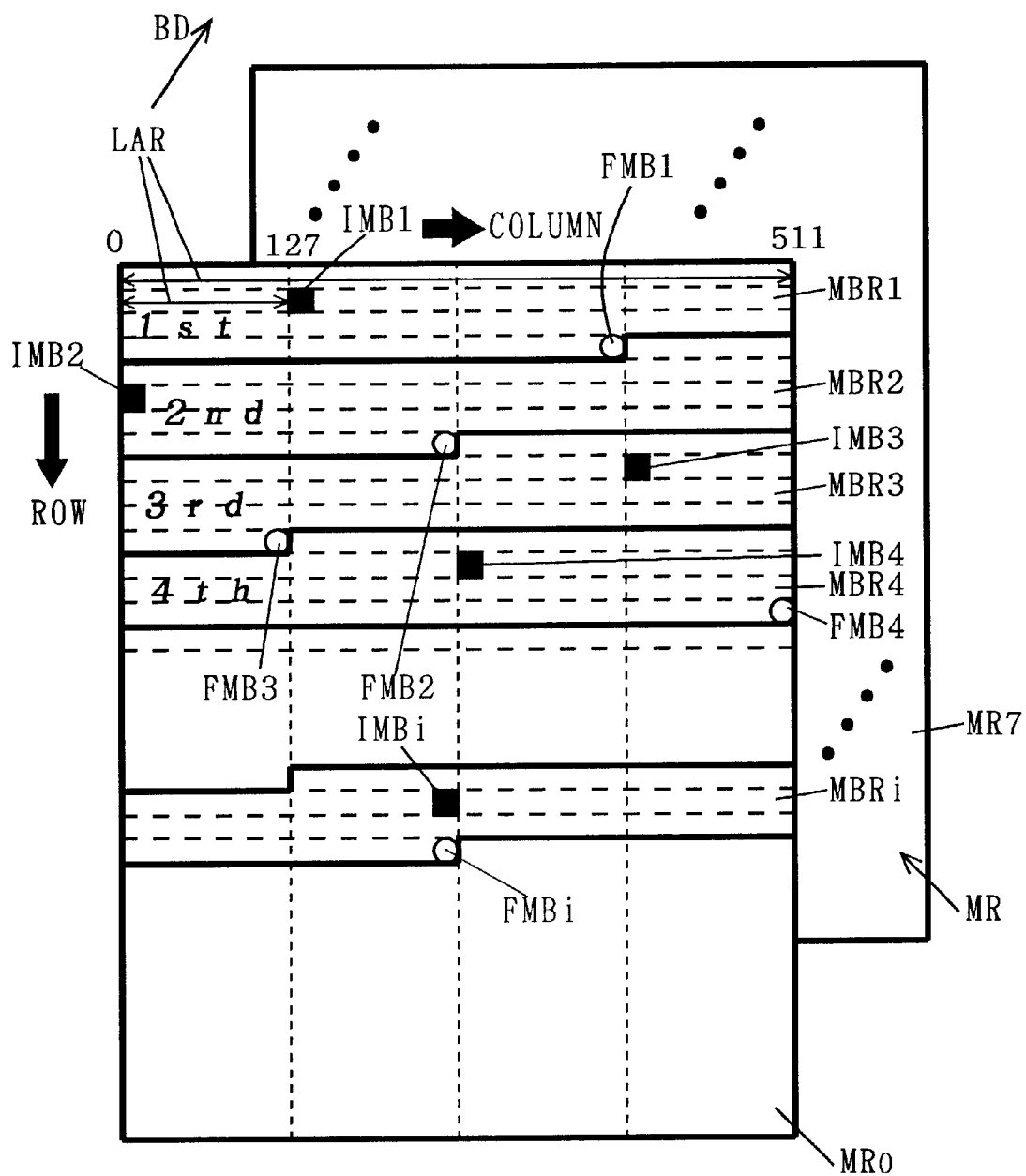
FIG. 11 is a diagram showing a mapping method of the second preferred embodiment.

FIG. 11 is a schematic diagram of the frame memory 13 showing the mapping method. In FIG. 11, each black square shows an address of the first data (in the example of FIG. 4, the data "0" ) in the initial macro-block IMBi, which is specified in each macro-block row MBRi in accordance with the X size of that format, and each circle shows the address of the last data (in the example of FIG. 4, the data "255") in the final macro-block FMBi. In this case, every time each macro-block row MBRi is mapped, a memory region corresponding to the difference LAR shown in FIG. 11 becomes free in the maximum macro-block row.

This enables mapping and block/raster conversion independent of the format only with (1) a difference between the X size of the particular format with the max condition and the X size of the format to be handled and (2) the end information (address) of each macro-block row. Furthermore, unlike in the first preferred embodiment, the portion for generating the sync signal MBRSYNC is not required, so that the circuit scale can be reduced.

(Third Preferred Embodiment)

An object of this preferred embodiment is to realize a BD-RD converting device 1 adaptable to various output formats. The device 1 has the same internal configuration as that shown in FIG. 2. That is to say, the BD-RD converting device 1 of this preferred embodiment is characterized in that the memory address generating circuit 12 outputs the address Add. so that raster data RD of various output formats can be obtained by switching the row address in reading, wherein (1) odd line data and even line data can be independently outputted, or (2) can be outputted in a line repeating manner, for example. The mapping technique characterizes this preferred embodiment.

Figure 12:
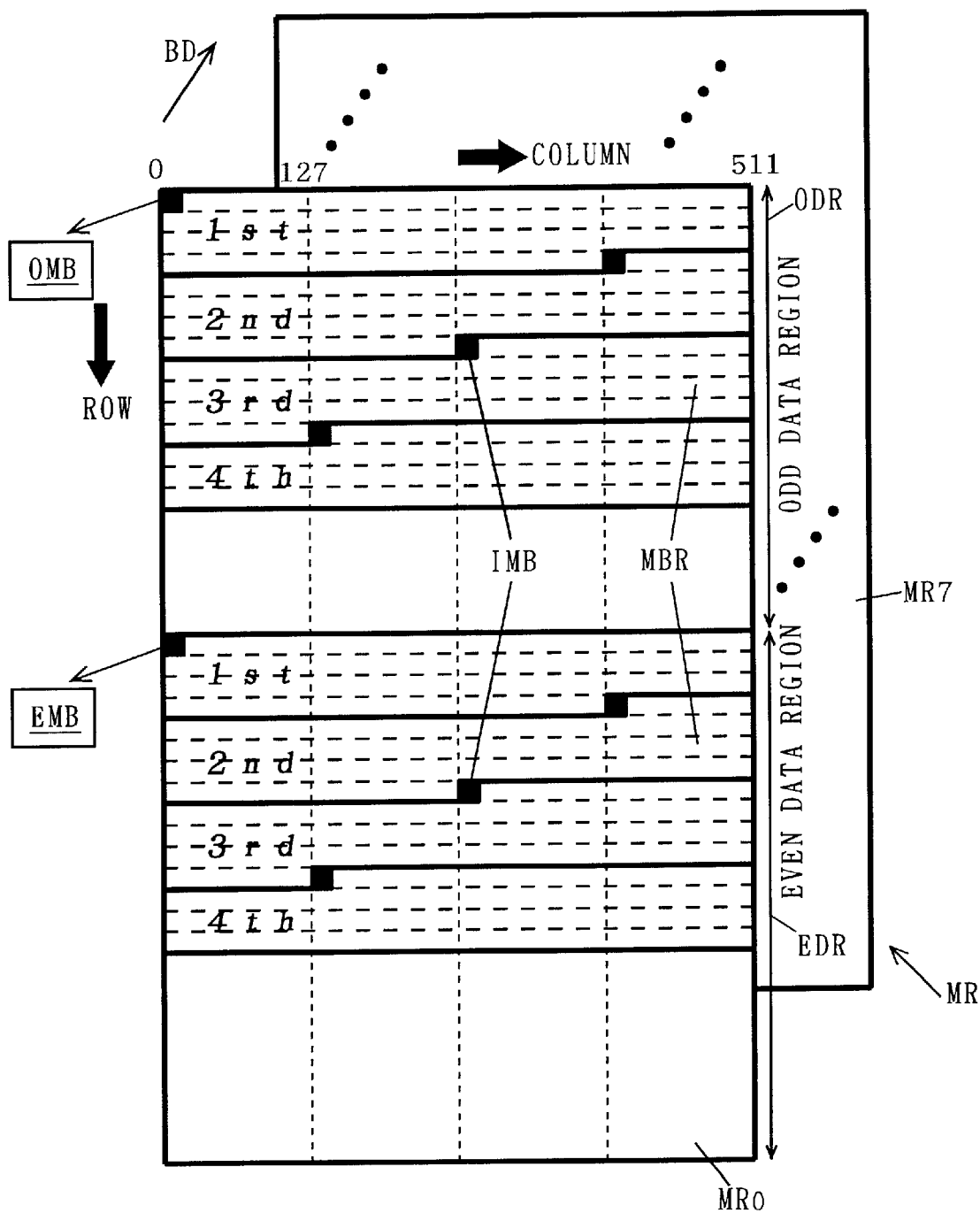
FIG. 12 is a diagram showing a mapping method of a third preferred embodiment.
Figure 15:
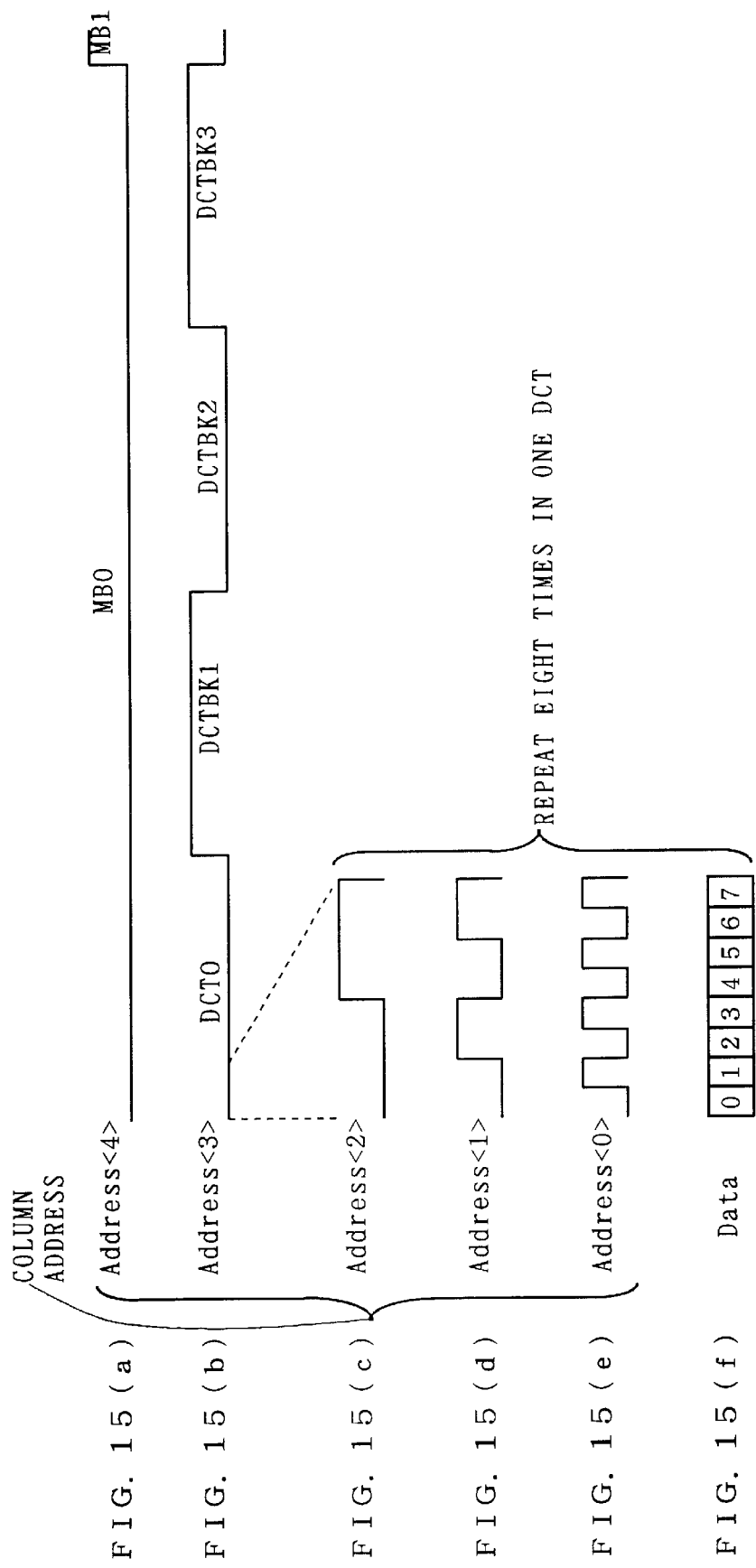
FIGS. 15(a)–(f) provide timing charts showing the column address in writing.
Figure 16:
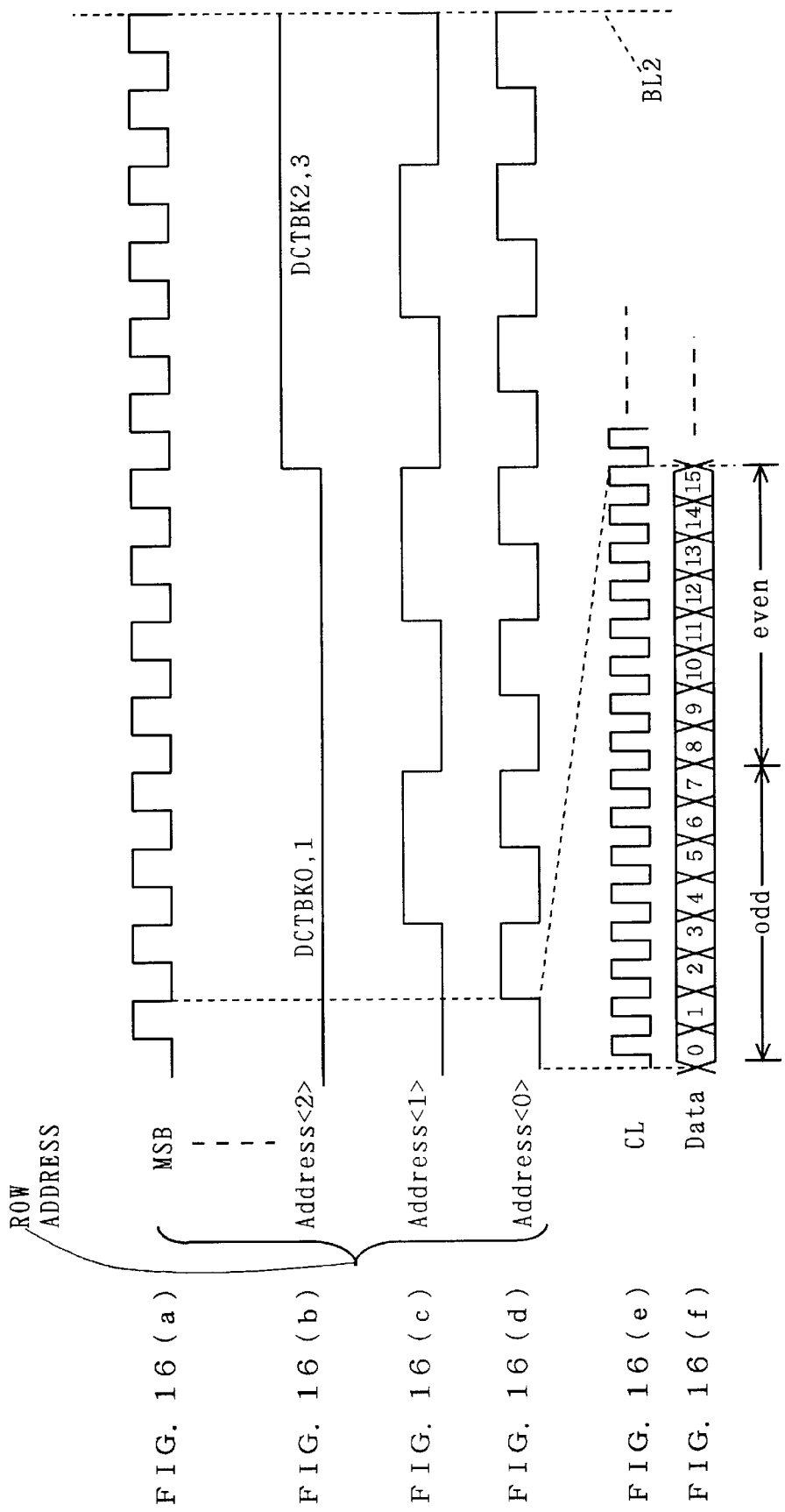
FIGS. 16(a)–(f) provide timing charts showing the row address in writing.
Figure 17:
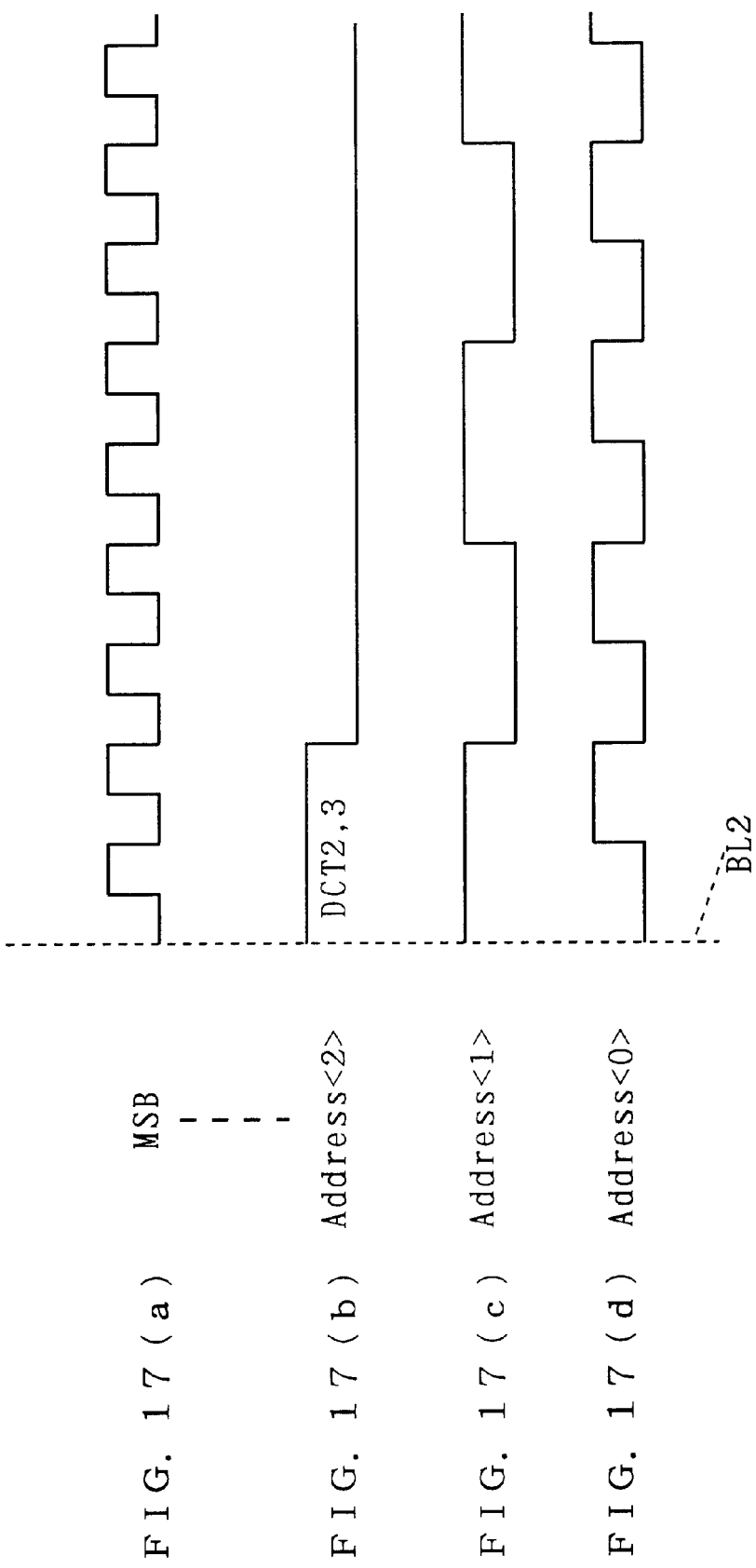
FIGS. 17(a)–(d) provide timing charts showing the row address in writing.

FIG. 12 is a diagram showing the method of mapping into the frame memory 13. As shown in FIG. 12, the memory region MR (MR0–MR7) in the frame memory 13 is divided in the row direction into two, i.e., (1) the MSB-side region EDR and (2) the LSB-side region ODR, wherein the macro-block data in odd lines OL (refer to FIG. 4) forming one macro-block MB is mapped into the (2) odd data region ODR and the macro-block data in even lines EL (FIG. 4) is mapped into the (1) even data region EDR. In FIG. 12, the character OMB indicates an odd line block (FIG. 13) formed of the data in odd lines OL in the macro-block MB of FIG. 4 and EMB indicates an even line block (FIG. 14) formed of the data in even lines EL in the macro-block MB.

In this preferred embodiment, the macro-block data is mapped and the data is read in the same way as described in the first and second preferred embodiments. FIG. 12 shows an example of an application of the method shown in the first preferred embodiment. In this embodiment, it is necessary in mapping to alternately switch the row address in the address Add. depending on whether it is an odd line OL or an even line EL. The row address can be switched merely by switching "0" and "1" in the most significant bit, since the most significant bit of the row address in the odd data region ODR is "0" and the most significant bit of the row address in the even data region EDR is "1." (For example, when the row address is represented With three bits, the row address is "000"–"011" in the region ODR and the row address is "100"–"111" in the region EDR.)

FIGS. 15(a)–(f) shows the timing of the column address for mapping one macro-block MB, and FIGS. 16(a)–(f), FIGS. 17(a)–(d) show the timing of the row address. In FIGS. 16(a)–(f) and FIGS. 17(a)–(d), the characters "DCTBK0, 1" denote the timing of specifying row addresses in the DCT blocks DCTBK0, DCTBK1 of the macro-block MB. Although the timing is shown only in one of them (DCTBK0), addresses are actually specified with the same timing in the other one (DCTBK1). The same applies to the characters "DCTBK2, 3."

When reading data, (1) if the read address (Add.) described in the first preferred embodiment is generated for the data in each macro-block row MBR in the odd data region ODR, the raster data RD in the odd lines OL are outputted from the frame memory 13. On the other hand, (2) when the read address (Add.) is similarly generated for the data in each macro-block row in the even data region EDR, raster data RD in the even lines EL are outputted.

This allows the odd line data and the even line data to be separately and independently outputted. This provides an output format suitable for the interlaced scanning.

With color difference signal, it is necessary to repeat lines, as odd line data, odd line data, even line data, even line data, . . . . In this case, odd line data and odd line data can be repeatedly outputted in the raster data format by repeatedly addressing each data in the odd data region ODR in FIG. 12 twice in the same method as that in the first preferred embodiment. Next, even line data and even line data can be repeatedly outputted as raster data by similarly addressing the even data region EDR.

Thus, the memory region MR (MR0–MR7) in the frame memory 13 is divided in the row direction into two and the odd line data and even line data are alternately mapped into the corresponding regions (ODR, EDR), whereby the output format of the raster data can be easily varied.

(Fourth Preferred Embodiment)

When the frame memory 13 of FIG. 2 has two memory regions MR and the macro-block data inputted with column addresses and row addresses are mapped corresponding to the selection of the two memory regions, the same function as that of the third preferred embodiment can be realized by using this frame memory 13.

Figure 18:
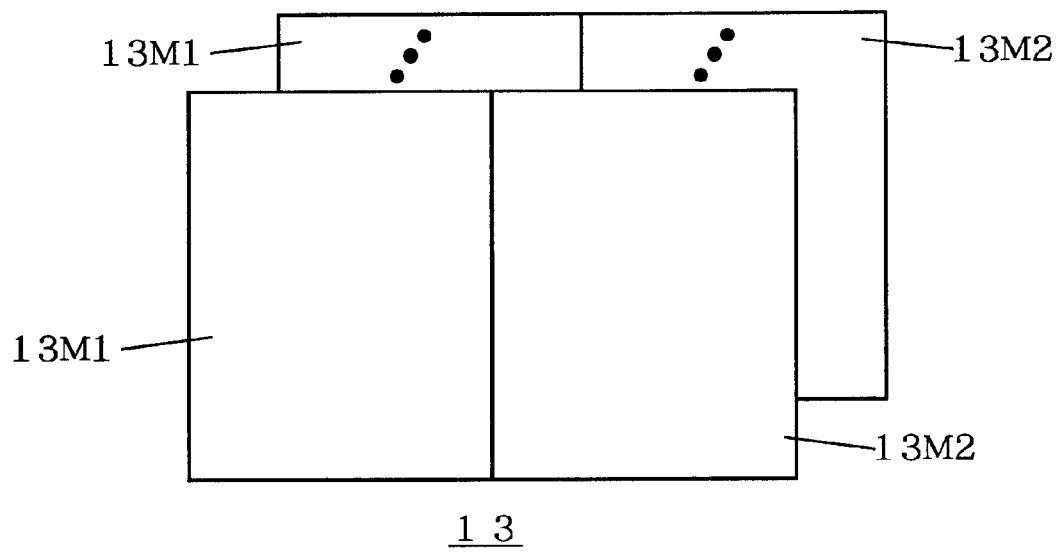
FIG. 18 is a diagram showing a configuration of memory regions of a frame memory of a fourth preferred embodiment.
Figure 19:
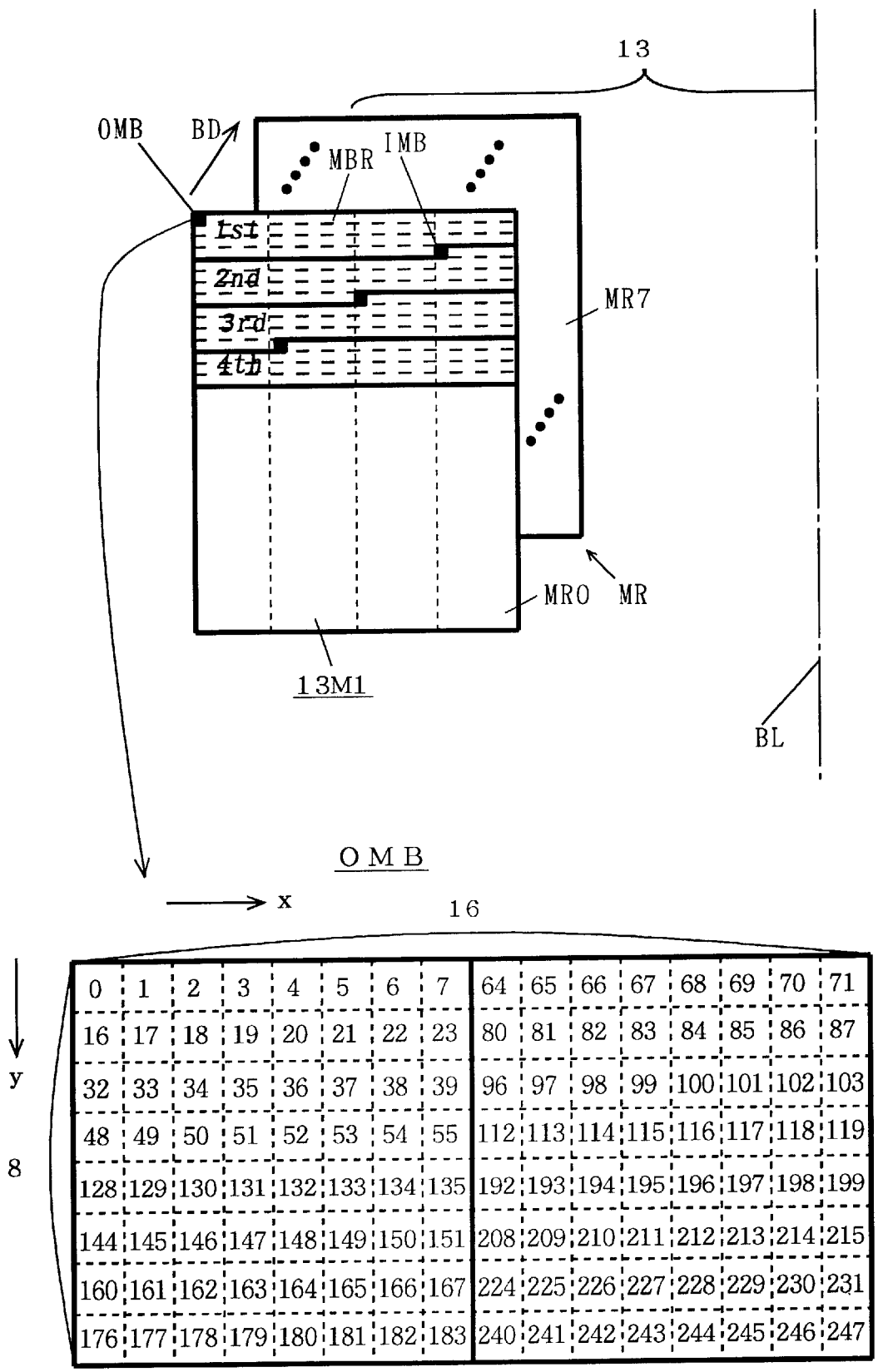
FIG. 19 is a diagram showing a mapping method of the fourth preferred embodiment.
Figure 20:
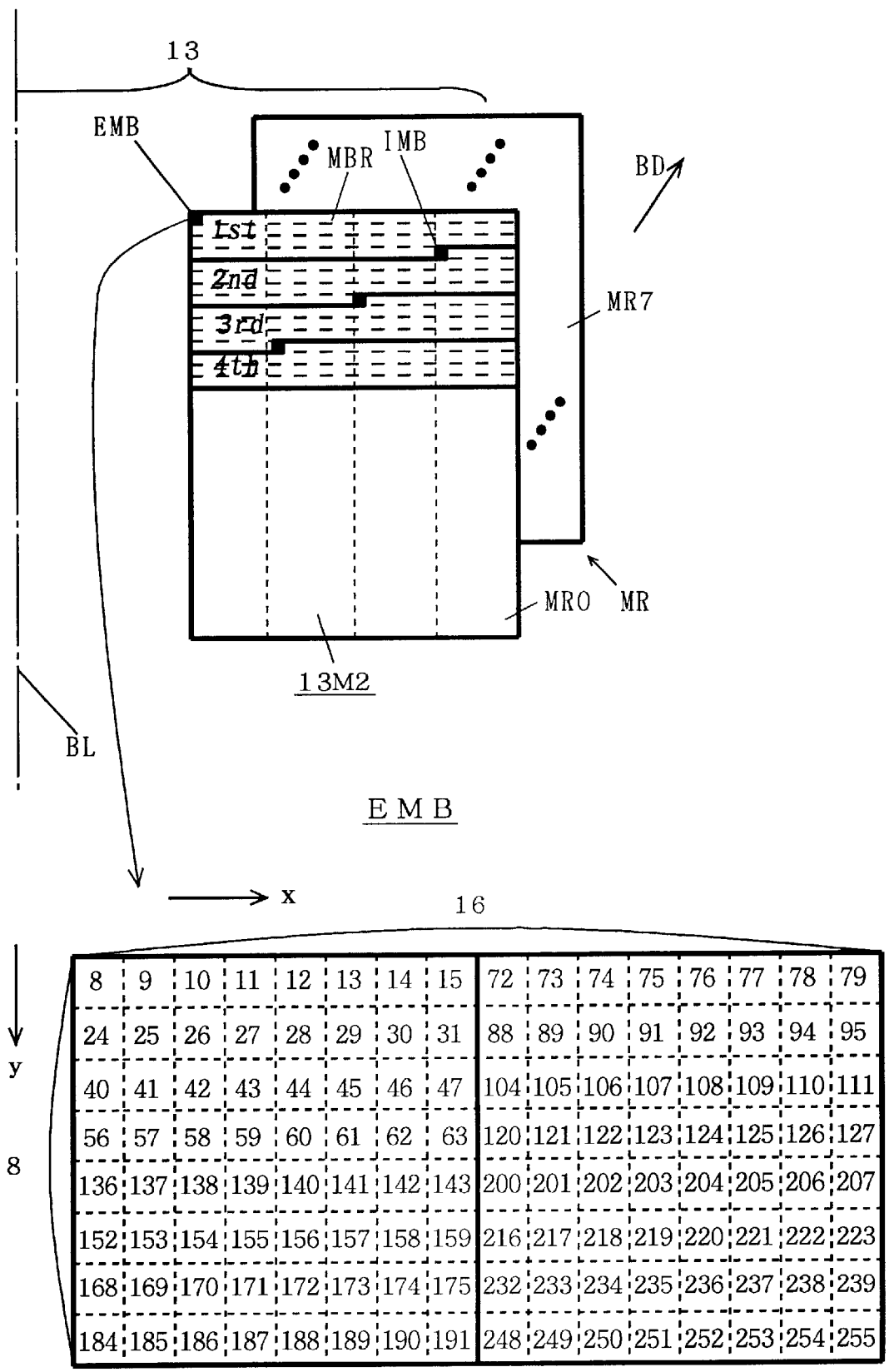
FIG. 20 is a diagram showing the mapping method of the fourth preferred embodiment.

FIG. 18–FIG. 20 show the method of mapping into the memory regions of such a frame memory 13. In FIG. 19 and FIG. 20, the same reference characters as those in FIG. 12 show the same parts.

The mapping shown in FIG. 18–FIG. 20 is performed as follows. That is to say, the memory address generating circuit 12 in FIG. 2 receives specification control signal (CNT) for the first and second memory regions 13M1 and 13M2, which is outputted from the memory controller 14 when writing, to alternately map the macro-block data in odd lines forming the macro-block MB into the first memory region 13M1 of FIG. 19 and the even line macro-block data into the second memory region 13M2 of FIG. 20.

Then the raster data of various output formats can be easily outputted by switching the first and second memory regions 13M1 and 13M2 in the frame memory 13 and switching the row addresses in each memory region 13M1 and 13M2, where (1) the odd line data and the even line data can be independently outputted, or (2) the data can be outputted in a line repeating manner, for example. This point is the same as that shown in FIG. 12 in the third preferred embodiment. The switching of the former is controlled by the memory controller 14 in FIG. 1 and the switching of the latter, the row address, is done by the memory address generating circuit 12.

(Fifth Preferred Embodiment)

Figure 21:
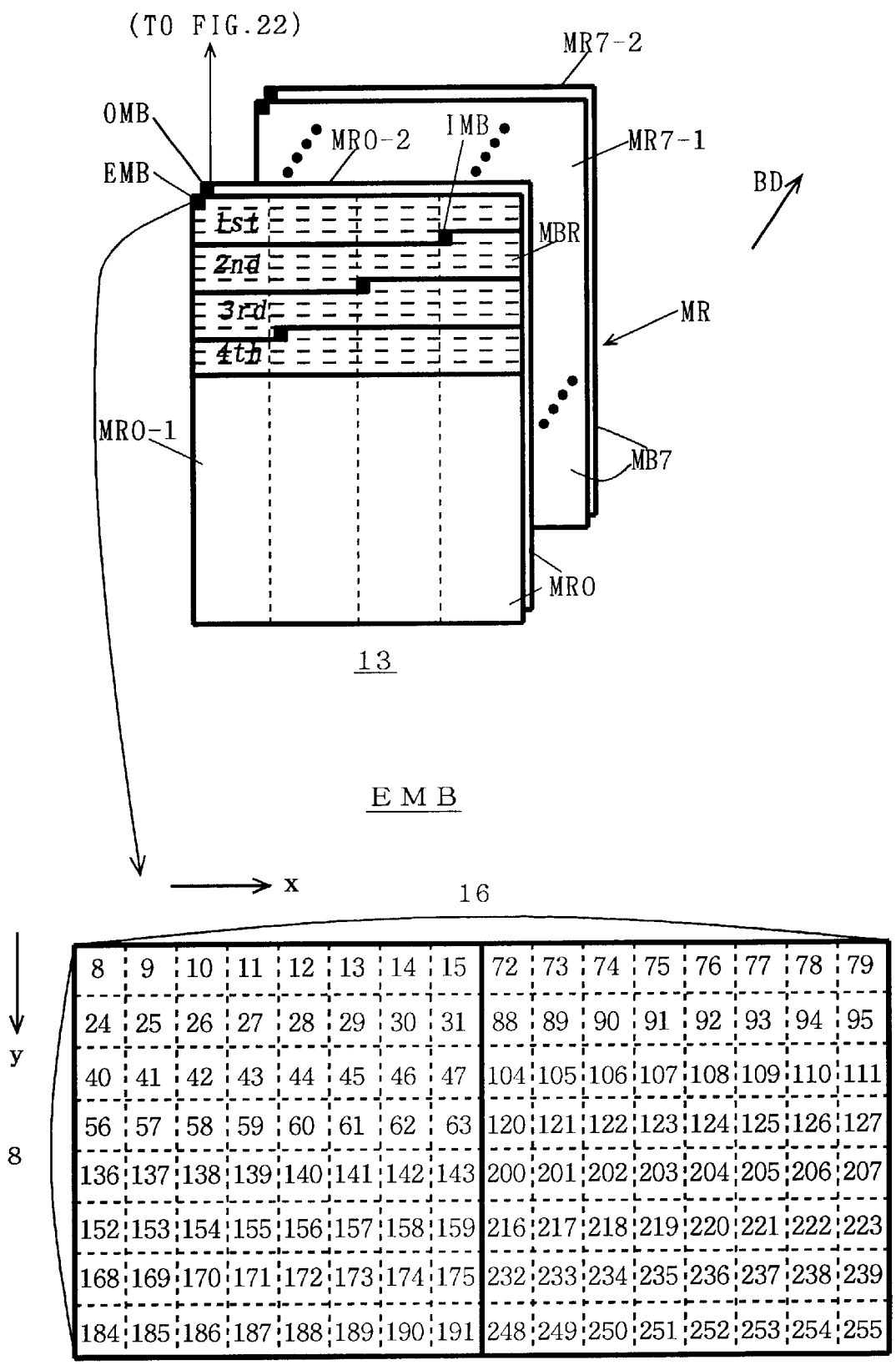
FIG. 21 is a diagram showing a mapping method of a fifth preferred embodiment.
Figure 22:
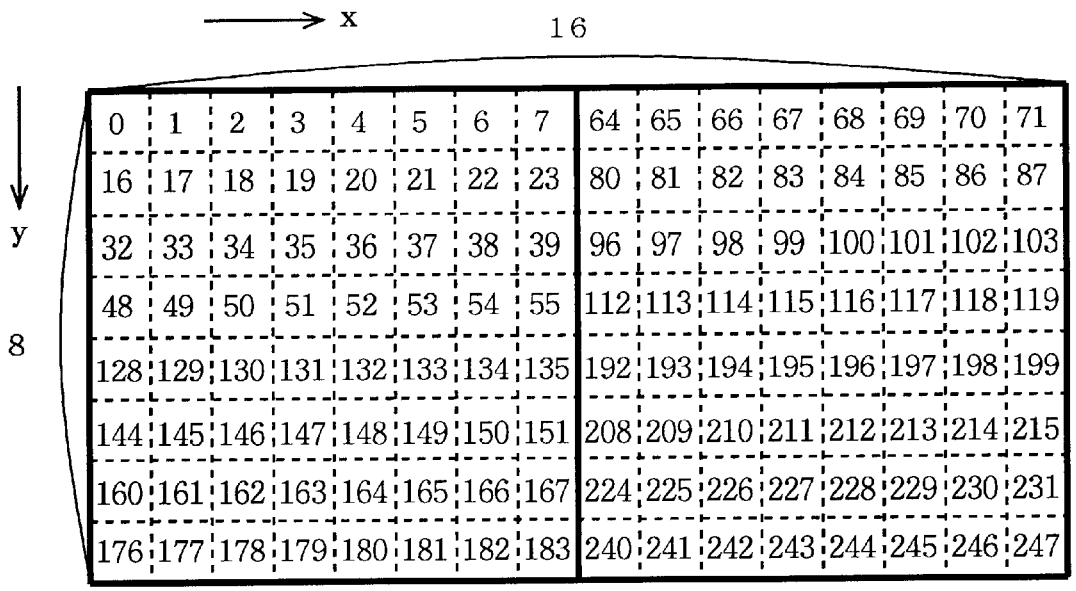
FIG. 22 is a diagram showing a data array in an odd line macro-block.

FIG. 21 shows a method of mapping into the memory region MR of the frame memory 13 in this preferred embodiment. FIG. 22 shows a data array of the macro-block OMB formed of odd line data shown in FIG. 21. In FIG. 21, the same reference characters as those in FIG. 5 show the same parts.

According to this preferred embodiment, as shown in FIG. 21, when performing block to raster conversion by using the frame memory 13 in which macro-block data is mapped with column addresses and row addresses, the memory region MR (MR0–MR7) is divided into two in the bit direction BD, i.e., the MSB-side region MR0-2, . . . , MR7-2 and the LSB-side region MR0-1, . . . , MR7-1. Since each picture element is of 8 bits, one-bit of picture element data is mapped into one of the regions MRi-1, MRi-2 ($0 \leq i \leq 7$). The frame memory 13 has (8×2=) 16 memory regions MR0-1, MR0-2, . . . , MR7-1, MR7-2 in the bit direction BD. This preferred embodiment is characterized by having a data pre-processing circuit 20 (FIG. 23) and the memory address generating circuit 12 (FIG. 2) for mapping the macro-block data BD in odd lines OL forming the macro-block MB (FIG. 4) into one region MRi-2 and the macro-block data BD in even lines EL into the other region MRi-1.

Figure 23:
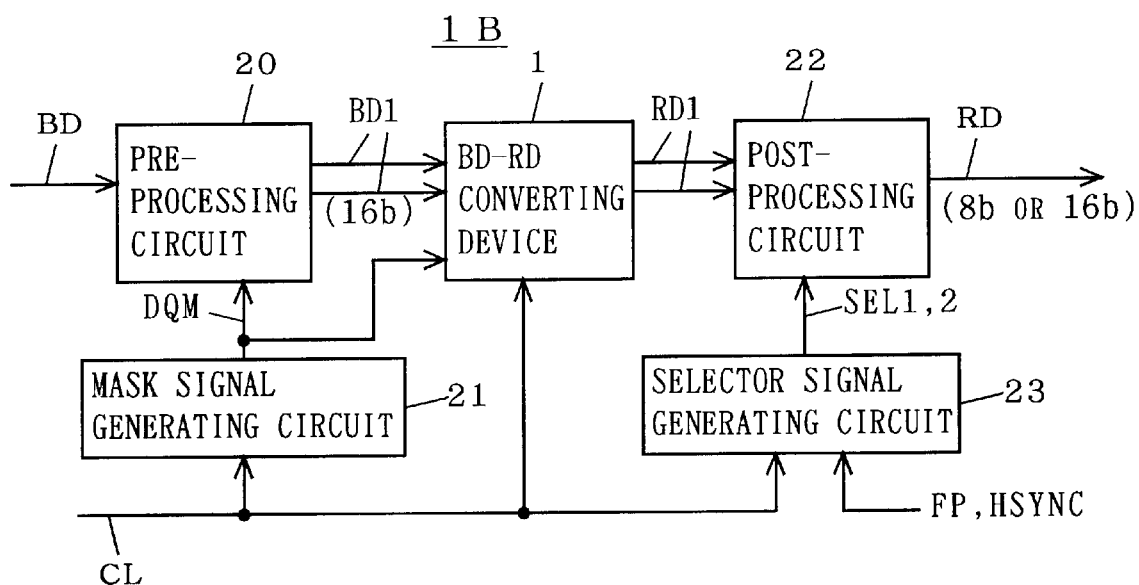
FIG. 23 is a block diagram showing a BD-RD converting device according to the fifth preferred embodiment.

FIG. 23 shows a BD-RD converting device 1B of this preferred embodiment, which has the above-mentioned pre-processing circuit 20, a mask signal generating circuit 21, the BD-RD converting device 1 corresponding to the BD-RD converting device in FIG. 2, a post-processing circuit 22, and a selector signal generating circuit 23. The entire system is the same as that in FIG. 1 (the BD-RD converting device 1B in FIG. 23 corresponds to the device 1 in FIG. 1). The mask signal generating circuit 21 divides the clock CL to generate a mask signal DQM, and the selector signal generating circuit. 23 generates first and second select signals SEL1 and SEL2 in accordance with a frame pulse FP outputted as one of the control signal CNT from the memory controller 14 in synchronization with the clock CL, or in accordance with the signal HSYNC outputted from the sync signal generating counter 11.

Figure 24:
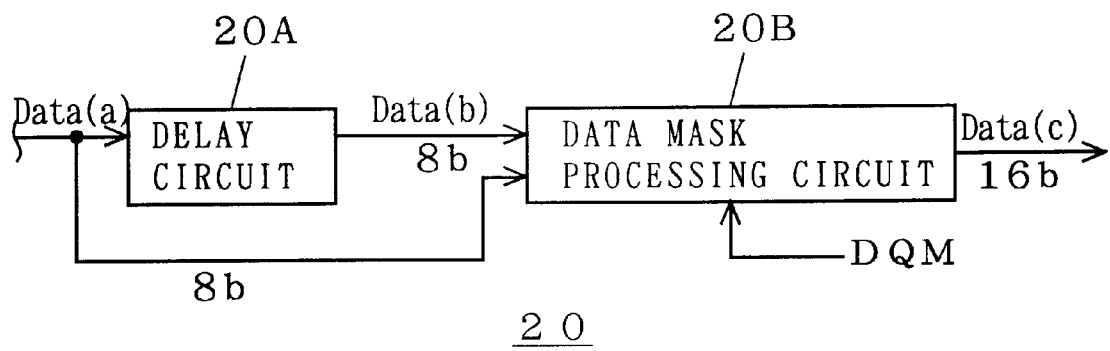
FIG. 24 is a block diagram showing a configuration of a pre-processing circuit.
Figure 25:
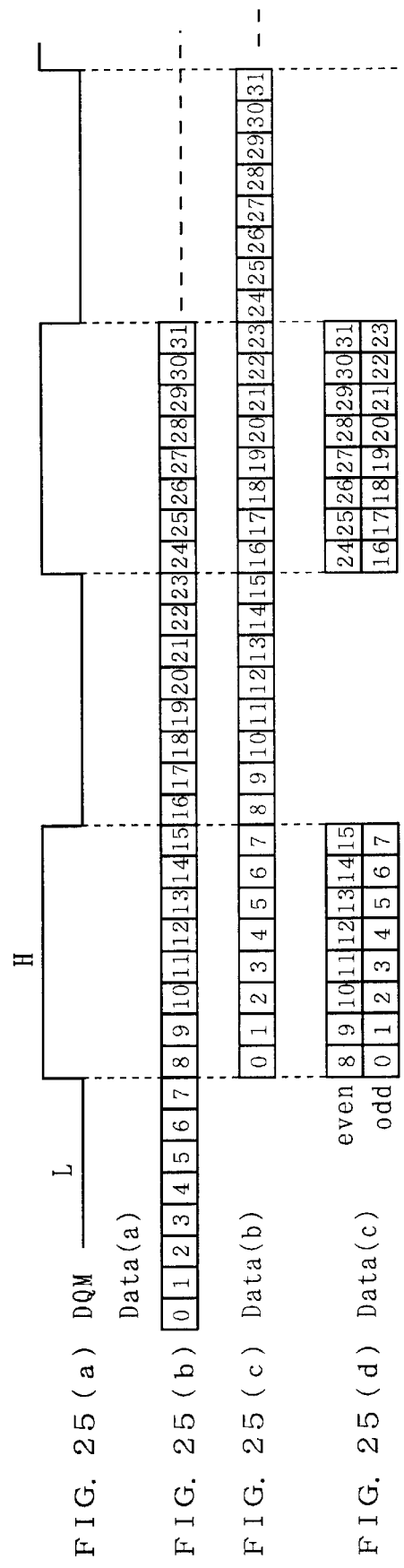
FIGS. 25(a)–(d) provide timing charts in operation of the pre-processing circuit.

FIG. 24 is a block diagram of the pre-processing circuit 20 and FIG. 25(*a*)–(*d*) provides a timing chart of the operation in the circuit 20. In FIGS. 24, 25(*a*)–(*d*), Data (*a*) corresponds to the macro-block data BD in FIG. 23 and Data (*c*) corresponds to the data BD1 in FIG. 23. The delay circuit 20A delays the macro-block data BD for a time corresponding to the amount of data in one line in the macro-block MB (here, "0"–"7"). The data mask processing circuit 20B masks and does not output the input data Data (*a*) and Data (*b*) in the period of the active level (L level) of the mask signal DQM. Accordingly, the odd line mask block data and the even line mask block data are simultaneously outputted as the signal Data (*c*), or a 16-bit signal of the data BD1, only in the H level period of the mask signal DQM.

The memory address generating circuit 12 (FIG. 2) maps the macro-block data in a manner similar to that of the first preferred embodiment. However, note that the odd data and the even data are written into the memory at the same time by the pre-processing circuit 20 in accordance with the control signal CNT outputted from the memory controller 14. Hence, it is not necessary to switch the memory region in the bit direction. Although the example shown in FIG. 21 adopts the mapping method in the first preferred embodiment, it goes without saying that it can be based on the method of the second preferred embodiment (FIG. 11). The method of addressing for reading data is also basically the same as that in the first and second preferred embodiments.

Figure 26:
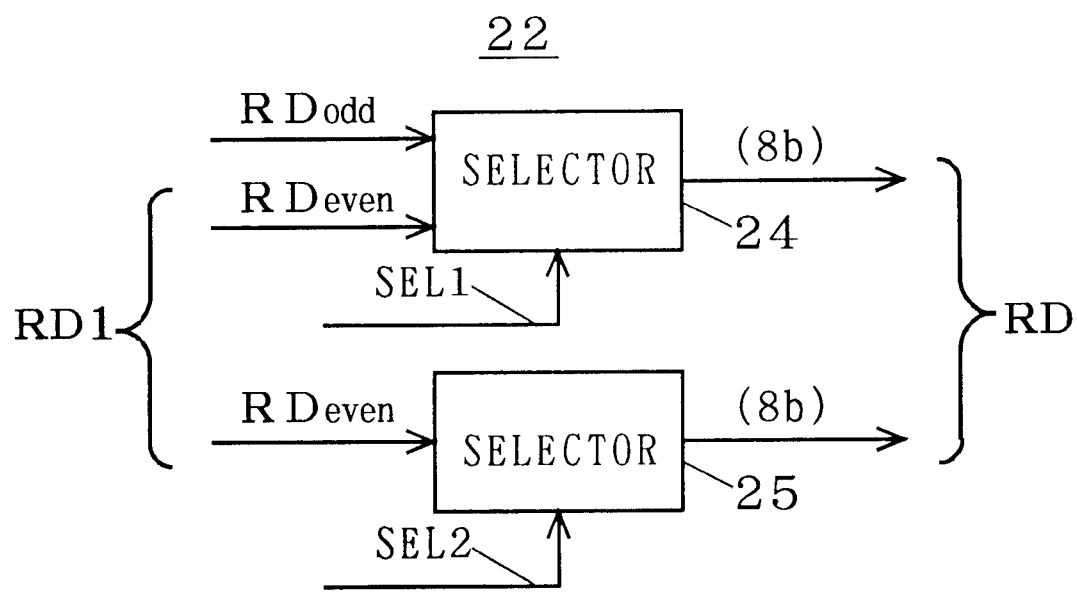
FIG. 26 is a block diagram showing an example of a configuration of a post-processing circuit.

FIG. 26 is a diagram showing the internal configuration of the post-processing circuit 22, which is formed of two selectors 24 and 25. The selectors 24, 25 are switched depending on the output format of the raster data RD1 and RD.

This preferred embodiment is characterized in that the pre-processing circuit 20 provides the odd line data and the even line data in the macro-block as the same bus data and the data is written into the memory at the same time and read at the same time (the memory regions in the bit direction are not independently controlled when reading data from the memory).

(1) Examples in which the odd line data and the even line data are independently outputted include the following cases (a) and (b). That is to say, (a) when alternately outputting the odd/even data for each line, the selector signal generating circuit 23 in FIG. 23 alternately switches the level of the first select signal SEL1 between "H" and "L" in accordance with the timing of the signal HSYNC. At this time, the second select signal SEL2 is maintained at "L", and thus the selector 25 does not output even line data RDeven. Then the selector 24 sequentially and independently outputs the odd line data RDodd (8 bits) and the even line data RDeven (8 bits) in accordance with the rising and falling timing of the first select signal SEL1. FIGS. 27(a)–(d) provides the timing chart in this case.

(b) When the odd/even data is alternately outputted for each field, the circuit 23 alternately switches the level of the first select signal between "H" and "L" in accordance with the timing of the frame pulse FP outputted at the beginning of read of the data. At this time, the level of the second select signal SEL2 is maintained at "L", and thus the selector 25 does not output the even line data RDeven. Then the selector 24 sequentially and independently outputs the odd line data RDodd (8 bits) and the even line data RDeven (8 bits) in accordance with the rising and falling timing of the first select signal SEL1. FIGS. 28(a)–(c) shows the timing chart in this case.

(2) On the other hand, when simultaneously outputting the odd line data RDodd and the even line data RDeven, the selector signal generating circuit 23 in FIG. 23 sets both of the first and second select signals SEL1 and SEL2 at "H". Then the selectors 24 and 25 output corresponding data RDodd and RDeven at the same time. FIGS. 29(a)–(c) shows the timing chart in this case.

(3) For line repeating, the circuit 23 in FIG. 23 sets the first and second select signals SEL1 and SEL2 as shown in FIGS. 30(c) and (d). For example, when repeatedly outputting the even line data RDeven, the first and second select signals SEL1 and SEL2 are both set at the "L" level.

It is thus possible to easily obtain a more variety of output formats by switching the row address with the memory address generating circuit 12 (FIG. 2) and switching the storage regions MRi-1 and MRi-2 in the bit direction with the memory controller 14, where (1) the odd line data and the even line data can be independently outputted, or (2) the odd line data and the even line data can be simultaneously outputted, or (3) ladder data can be outputted in a line repeating manner, for example.

(Sixth Preferred Embodiment)

This preferred embodiment provides a technique common to the first to fifth preferred embodiments.

When performing block to raster conversion by using a frame memory in which macro-block data are mapped with column addresses and row addresses as those in the first to fifth preferred embodiments, it is necessary to precharge each memory cell in the frame memory every time the row address is switched in reading. In the case of the mapping shown in FIG. 5, for example, there is a necessity of switching the row address after reading 128–512 pieces of data irrespective of the handled format.

Figure 31:
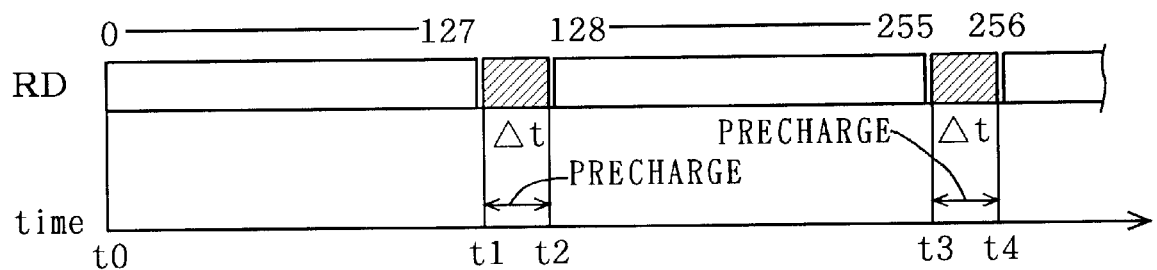
FIG. 31 is a timing chart showing precharge operation in a sixth preferred embodiment.
Figure 32:
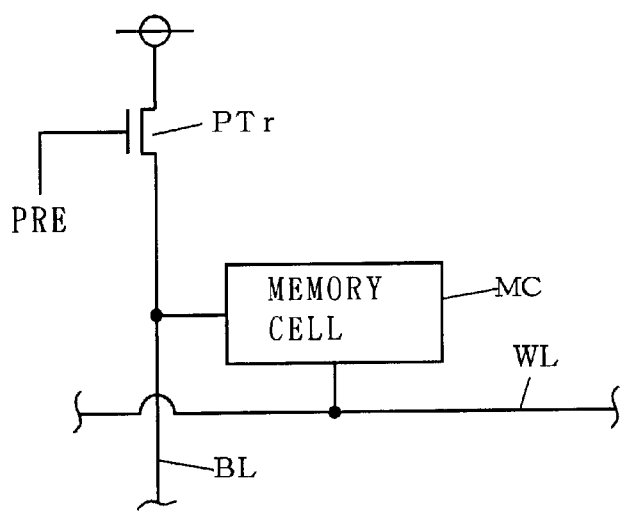
FIG. 32 is a diagram showing an example of a memory cell.

Accordingly, in this preferred embodiment, as shown in FIG. 31, the frame memory is precharged every time raster data of a format having the minimum row address switching timing is read, that is, herein, every time 128 pieces of raster data are read. In the example of FIG. 31, in the precharge periods Δt in times t1–t2, t3–t4, the memory controller 14 (FIG. 2) provides each memory cell (e.g., the precharge transistor PTr of each memory cell MC shown in FIG. 32) with a precharge signal PRE as one of the control signal CNT in accordance with the data output timing (BL, WL in FIG. 32 show a bit line and a word line).

This enables precharge in the above-described common BD-RD converting device 1 which is independent of the format. Furthermore, since the precharge periods Δt equally exist between data outputs as shown in FIG. 31, the gap which may occur in the precharge periods can easily be removed.

While the invention has been described in detail, the foregoing description is in all aspects illustrative and not restrictive. It is understood that numerous other modifications and variations can be devised without departing from the scope of the invention.

We claim:

1. A semiconductor integrated circuit for converting macro-block data into raster data, comprising:

a memory, wherein said memory comprises:

a memory region including maximum macro-block row regions into each of which said macro-block data included in each of a plurality of maximum macro-block rows can be mapped, said plurality of maximum macro-block rows each having a region determined on the basis of the data size of said particular format in said horizontal direction and in a vertical direction; and memory control means for controlling mapping of said macro-block data of an arbitrary format among a plurality of formats into said memory on the basis of mapping a particular format having a maximum data size in a horizontal direction among said plurality of formats, wherein said memory control means comprises:

mapping control means for mapping said macro-block data of said arbitrary format, for each macro-block row whose region is determined on the basis of said data size of said arbitrary format, into one of said maximum macro-block row regions corresponding to that macro block row, according to a data array of a plurality of macro-blocks belonging to that macro-block row, wherein said mapping control means comprises:

address generating means for generating an address of said macro-block for each said macro-block row of said arbitrary format, specifying an address of said macro-block data at the head of an initial macro-block belonging to that macro-block row, as initial data in corresponding one of said maximum macro-block row regions, on the basis of which address said address generating means generating addresses of said macro-block data belonging to that macro-block row in accordance with said data array and outputting the obtained address signal to said memory.

2. The semiconductor integrated circuit according to claim 1, wherein said memory control means further comprises:

data read control means for, for each said macro-block row of said arbitrary format, specifying a row address and a column address of said address of said initial macro-block data belonging to that macro-block row, sequentially switching said column address on the basis of said address of said initial macro-block data, and switching said row address when said macro-block data belonging to a line in said horizontal direction belonging to that macro-block row has been all read and when said macro-block data written in an address at a turn of each of said maximum macro-block row regions has been read, thereby reading data from said memory region.

3. The semiconductor integrated circuit according to claim 2, wherein said memory region comprises first and second memory regions, and said address generating means comprises:
  (a) means for mapping said macro-block data belonging to odd lines in said horizontal direction in said macro-block into said first memory region; and
  (b) means for mapping said macro-block data belonging to even lines in said horizontal direction in said macro-block into said second memory region.

4. The semiconductor integrated circuit according to claim 2, wherein said memory comprises, as said memory region, first and second memory regions separated into two in its bit direction, and said address generating means comprises:
  pre-processing means for pre-processing sequentially inputted said macro-block data into bus data having odd line data formed of said macro-block data belonging to odd lines in said horizontal direction in said macro-block and even line data formed of said macro-block data belonging to even lines in said horizontal direction each corresponding to the line next to each of said odd lines in said horizontal direction, and
  means for mapping said odd line data and said even line data into said first and second memory regions, respectively.

5. The semiconductor integrated circuit according to claim 4, wherein said data read control means comprises:
  means for simultaneously reading said odd line data and said even line data corresponding thereto as said bus data,
  wherein said semiconductor integrated circuit further comprises:
    post-processing means for applying certain post-processing to said read bus data to output said raster data having a certain output format.

6. The semiconductor integrated circuit according to claim 2, further comprising:

precharge means for regularly precharging said memory region in accordance with a format having a minimum timing for switching said row address when reading said macro-block data.

7. A semiconductor integrated circuit for converting macro-block data into raster data, comprising:

a memory, wherein said memory comprises:
  a memory region including maximum macro-block row regions into each of which said macro-block data included in each of a plurality of maximum macro-block rows can be mapped, said plurality of maximum macro-block rows each having a region determined on the basis of the data size of said particular format in said horizontal direction and in a vertical direction; and
  memory control means for controlling mapping of said macro-block data of an arbitrary format among a plurality of formats into said memory on the basis of mapping a particular format having a maximum data size in a horizontal direction among said plurality of formats, wherein said memory control means comprises:
    mapping control means for mapping said macro-block data of said arbitrary format, for each macro-block row whose region is determined on the basis of said data size of said arbitrary format, into one of said maximum macro-block row regions corresponding to that macro block row, according to a data array of a plurality of macro-blocks belonging to that macro-block row, wherein said mapping control means comprises:
      address generating means for generating an address for said macro-block data for each said macro-block row of said arbitrary format,
      specifying an address of said macro-block data at the end belonging to that macro-block row as final data in corresponding one of said maximum macro-block row regions, and
      determining an address of said macro-block data at the head of an initial macro-block belonging to that macro-block row on the basis of a difference between the data size of said particular format in said horizontal direction and the data size of said arbitrary format in said horizontal direction, thereby generating an address signal for said macro-block data belonging to that macro-block row and outputting said address signal to said memory.

8. The semiconductor integrated circuit according to claim 7, wherein said memory control means further comprises:
  data read control means for, for each said macro-block row of said arbitrary format,
  specifying a row address and a column address of said address of said initial macro-block data belonging to that macro-block row, sequentially switching said column address on the basis of said address of said initial macro-block data, and switching said row address when said macro-block data belonging to a line in said horizontal direction belonging to that macro-block row has been all read and when said macro-block data written in an address at a turn of each of said maximum macro-block row regions has been read, thereby reading data from said memory region.

9. The semiconductor integrated circuit according to claim 8, wherein said memory region comprises first and second memory regions, and said address generating means comprises:
  (a) means for mapping said macro-block data belonging to odd lines in said horizontal direction in said macro-block into said first memory region; and
  (b) means for mapping said macro-block data belonging to even lines in said horizontal direction in said macro-block into said second memory region.

10. The semiconductor integrated circuit according to claim 8, wherein said memory comprises, as said memory region, first and second memory regions separated into two in its bit direction, and said address generating means comprises:
  pre-processing means for pre-processing sequentially inputted said macro-block data into bus data having odd line data formed of said macro-block data belonging to odd lines in said horizontal direction in said macro-block and even line data formed of said macro-block data belonging to even lines in said horizontal direction each corresponding to the line next to each of said odd lines in said horizontal direction, and means for mapping said odd line data and said even line data into said first and second memory regions, respectively.

11. The semiconductor integrated circuit according to claim 10, wherein said data read control means comprises:

means for simultaneously reading said odd line data and said even line data corresponding thereto as said bus data, wherein said semiconductor integrated circuit further comprises:

post-processing means for applying certain post-processing to said read bus data to output said raster data having a certain output format.

12. The semiconductor integrated circuit according to claim 8, further comprising:

precharge means for regularly precharging said memory region in accordance with a format having a minimum timing for switching said row address when reading said macro-block data.

* * * * *